(12) United States Patent  
Huang et al.

(10) Patent No.: US 9,412,261 B2  
(45) Date of Patent: Aug. 9, 2016

(54) SYSTEM AND METHOD FOR SETTING UP A UNIVERSAL REMOTE CONTROL

(75) Inventors: Steve LanPing Huang, Placentia, CA (US); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 2917 days.

(21) Appl. No.: 11/818,295

(22) Filed: Jun. 14, 2007

(65) Prior Publication Data

US 2007/0296552 A1    Dec. 27, 2007

Related U.S. Application Data

(63) Continuation of application No. 10/665,642, filed on Sep. 19, 2003, now Pat. No. 7,586,398, which is a continuation-in-part of application No. 10/151,635, filed on May 20, 2002, now Pat. No. 7,218,243, which is a continuation-in-part of application No. 09/615,473, filed on Jul. 13, 2000, now Pat. No. 8,098,140, and a continuation-in-part of application No. 09/334,584, filed on Jun. 16, 1999, now Pat. No. 6,781,518, which is a continuation-in-part of application No. 09/121,229, filed on Jul. 23, 1998, now Pat. No. 6,157,319, said application No. 10/151,635 is a continuation-in-part of application No. 09/905,423, filed on Jul. 13, 2001, now abandoned, application No. 11/818,295, which is a continuation-in-part of application No. 10/288,727, filed on Nov. 6, 2002, now Pat. No. 7,831,930.

(60) Provisional application No. 60/264,767, filed on Jan. 29, 2001, provisional application No. 60/344,020, filed on Dec. 20, 2001, provisional application No. 60/334,774, filed on Nov. 20, 2001.

(51) Int. Cl.  
*H04Q 3/02* (2006.01)  
*G08C 17/02* (2006.01)  
*G08C 19/28* (2006.01)  
*H04L 12/28* (2006.01)

(52) U.S. Cl.  
CPC ............... *G08C 17/02* (2013.01); *G08C 19/28* (2013.01); *H04L 12/282* (2013.01); *H04L 12/2805* (2013.01); *G08C 2201/20* (2013.01); *G08C 2201/21* (2013.01); *G08C 2201/92* (2013.01); *G08C 2201/93* (2013.01)

(58) Field of Classification Search  
CPC .... G08C 17/02; G08C 19/28; G08C 2201/93; G08C 2201/20; G08C 2201/92; G08C 2201/21; H04L 12/282; H04L 12/2805  
USPC .......... 340/12.22, 12.23, 12.24, 12.25, 12.28, 340/12.51, 13.21, 13.26, 4.3, 4.31, 4.32, 340/10.1, 10.5, 572.1; 341/176, 175; 348/734; 398/106, 107, 108, 111, 112  
See application file for complete search history.

(56) References Cited

U.S. PATENT DOCUMENTS 3,713,148 A    1/1973    Cardullo et al.  
4,959,810 A    9/1990    Darbee et al.

(Continued)

OTHER PUBLICATIONS

Sarma, "The Networked Physical World," Auto-ID Center White Paper, Oct. 1, 2000, pp. 1-16.*

(Continued)

*Primary Examiner* — Edwin Holloway, III  
(74) *Attorney, Agent, or Firm* — Greenberg Traurig, LLP

(57) ABSTRACT

A system and method for using an RFID tag to automatically setup and configure a universal remote control to command appliances of various types and various manufacturers.

73 Claims, 17 Drawing Sheets

(56) References Cited

U.S. PATENT DOCUMENTS

| | | | |
|---|---|---|---|
| 5,211,129 A | | 5/1993 | Taylor et al. |
| 5,255,313 A | | 10/1993 | Darbee |
| 5,438,335 A | | 8/1995 | Schuermann et al. |
| 5,552,917 A | | 9/1996 | Darbee et al. |
| 5,646,608 A | | 7/1997 | Shintani |
| 5,933,829 A | | 8/1999 | Durst et al. |
| 5,978,773 A | | 11/1999 | Hudetz et al. |
| 6,008,735 A | | 12/1999 | Chiloyan et al. |
| 6,104,334 A | | 8/2000 | Allport |
| 6,108,656 A | | 8/2000 | Durst et al. |
| 6,124,804 A | * | 9/2000 | Kitao et al. ............... 340/12.28 |
| 6,130,726 A | | 10/2000 | Darbee et al. |
| 6,133,847 A | | 10/2000 | Yang |
| 6,157,319 A | | 12/2000 | Johns et al. |
| 6,199,048 B1 | | 3/2001 | Hudetz et al. |
| 6,208,853 B1 | * | 3/2001 | LoVasco et al. ........... 455/414.1 |
| 6,223,348 B1 | | 4/2001 | Hayes et al. |
| 6,225,938 B1 | | 5/2001 | Hayes et al. |
| 6,317,028 B1 | * | 11/2001 | Valiulis ....................... 340/10.1 |
| 6,330,976 B1 | | 12/2001 | Dymetman et al. |
| 6,359,661 B1 | * | 3/2002 | Nickum ....................... 348/734 |
| 6,400,338 B1 | | 6/2002 | Mejia et al. |
| 6,434,561 B1 | | 8/2002 | Durst, Jr. et al. |
| 6,498,567 B1 | * | 12/2002 | Grefenstette et al. ...... 340/12.24 |
| 6,505,780 B1 | | 1/2003 | Yassin et al. |
| 6,542,933 B1 | | 4/2003 | Durst, Jr. et al. |
| 6,625,581 B1 | | 9/2003 | Perkowski |
| 6,750,801 B2 | * | 6/2004 | Stefanik ....................... 341/176 |
| 6,774,813 B2 | | 8/2004 | van Ee et al. |
| 6,791,467 B1 | | 9/2004 | Ben-Ze'ev |
| 2001/0033243 A1 | | 10/2001 | Harris et al. |
| 2002/0101357 A1 | | 8/2002 | Gharapetian |
| 2003/0030542 A1 | | 2/2003 | von Hoffmann |
| 2003/0137403 A1 | | 7/2003 | Carrender et al. |
| 2003/0141987 A1 | | 7/2003 | Hayes |
| 2003/0173403 A1 | | 9/2003 | Vogler |
| 2003/0189509 A1 | | 10/2003 | Hayes et al. |
| 2004/0025053 A1 | | 2/2004 | Hayward |
| 2004/0164148 A1 | | 8/2004 | Qiu |
| 2005/0242167 A1 | * | 11/2005 | Kaario et al. ................. 235/375 |

OTHER PUBLICATIONS

Brock, "The Electronic Product Code (EPC),"Auto-ID Center White Paper, Jan. 1, 2001. pp. I-21.*

VeriChip Corporation, Implantable Personal Verification Systems, Introducing VeriChip, 2 pages.

Thomas Schoch, Auto-ID Technology, MIT's Approach to Standardize Product Identification, M-Lab, Nov. 2, 2002, cover page thru p. 9, Version 1.0.

Auto-ID Center, Technology Guide, Massachusetts Institute of Technology, cover page thru Appendix.

European Patent Office, extended European Search Report issued on European patent application No. 10176275.5, dated Mar. 31, 2014, 8 pages.

U.S. Patent and Trademark Office, Notice of Allowance issued on U.S. Appl. No. 12/716,365 dated Jun. 10, 2013, 8 pages.

* cited by examiner

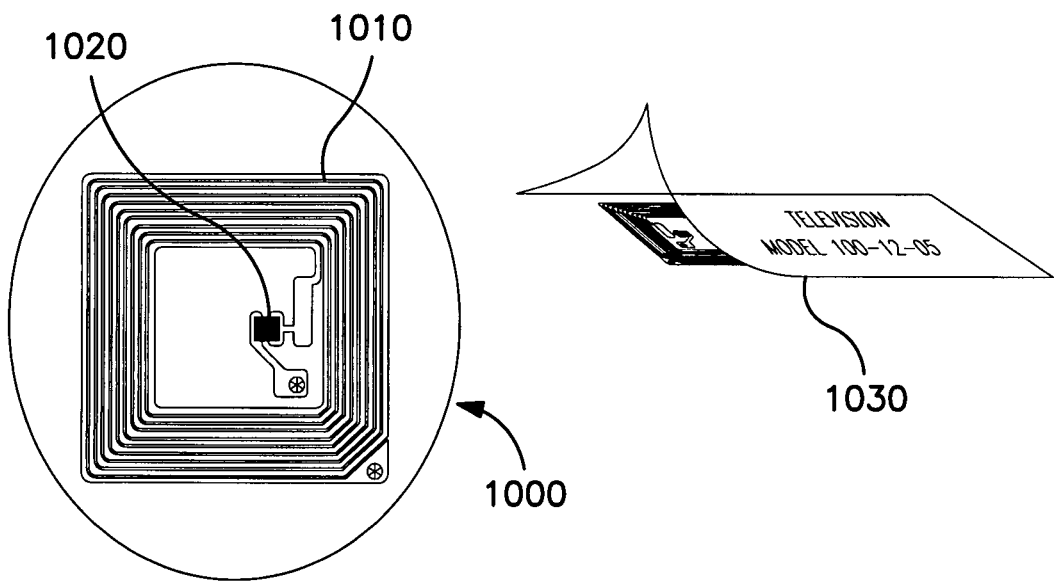
FIG. 10a
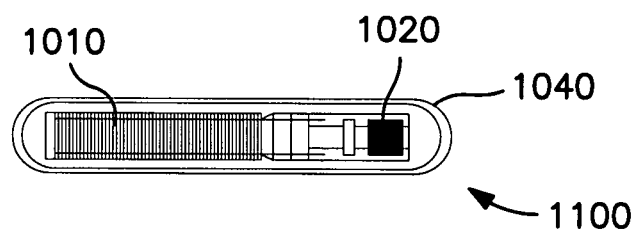
FIG. 10b
| ELECTRONIC PRODUCT CODE TYPE I |
01.0000A89.0001bF.0001b9DC0
FIG. 11

SYSTEM AND METHOD FOR SETTING UP A UNIVERSAL REMOTE CONTROL

RELATED APPLICATIONS

This application claims priority to and is a continuation of U.S. application Ser. No. 10/665,642, filed on Sep. 19, 2003, which is a continuation-in-part of U.S. application Ser. No. 10/151,635, filed May 20, 2002, (now U.S. Pat. No. 7,218, 243) which is: 1) a continuation-in-part of U.S. application Ser. No. 09/615,473, filed Jul. 13, 2000; 2) a continuation-in-part of U.S. application Ser. No. 09/334,584, filed Jun. 16, 1999, (now U.S. Pat. No. 6,781,518) which is a continuation-in-part of U.S. application Ser. No. 09/121,229, filed Jul. 23, 1998 (now U.S. Pat. No. 6,157,319); and 3) a continuation-in-part of U.S. application Ser. No. 09/905,423, filed Jul. 13, 2001, which claims priority to U.S. Provisional Application Ser. No. 60/264,767, filed on Jan. 29, 2001.

This application also claims priority to and is a continuation-in-part of U.S. application Ser. No. 10/288,727, filed Nov. 6, 2002, which claims priority to U.S. Provisional Application Ser. No. 60/344,020, filed Dec. 20, 2001, and U.S. Provisional Application Ser. No. 60/334,774, filed Nov. 20, 2001.

BACKGROUND OF THE INVENTION

This invention relates generally to remote control systems and, more particularly, to a system and method for setting up and configuring a universal remote control to command functions of one or more types of remotely controllable appliances of one or more manufacturers. Exemplary types of appliances include, but are not limited to televisions, video cassette recorders (VCRs), cable boxes, disk players, digital video recorders (DVRs), thermostats, game consoles, etc.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls for commanding various functions of various types of appliances of various manufacturers have become quite widespread. By way of example, universal remote controls are described in commonly assigned U.S. Pat. Nos. 4,959,810, 5,255,313 and 5,552,917.

In a common method of setting up a universal remote control, codes for commanding functions of an appliance are learned from a remote control supplied by the manufacturer with that appliance. The learned codes, which are stored within the universal remote control, are then available for subsequent transmission to the appliance. Alternatively, codes for commanding functions of appliances of various types and various manufacturers can be preprogrammed into the universal remote control. The user then interacts with the universal remote control to identify to the universal remote control which appliance(s) the user desires to command, i.e., the user manually enters an appliance code into the universal remote control such as described in U.S. Pat. No. 4,959,810. The universal remote control uses the user entered identity information to access those preprogrammed codes that are appropriate for commanding the identified appliance(s).

While these setup methods do work for their intended purpose, it has been seen that the manual process of setting up and configuring a universal remote control can be demanding, exacting, and generally frustrating for many users. Accordingly, a need exists for an improved system and method for setting up and configuring a universal remote control.

SUMMARY OF THE INVENTION

In accordance with this need, the following describes a system and method for allowing a universal remote control to be automatically setup and configured to command appliances of various types and various manufacturers.

A better appreciation of the objects, advantages, features, properties, and relationships of the system and method for setting up and configuring a universal remote control will be obtained from the following detailed description and accompanying drawings which set forth illustrative embodiments which are indicative of the various ways in which the principles of the system and method may be employed.

BRIEF DESCRIPTION OF THE DRAWINGS

For use in better understanding the exemplary systems and methods for setting up a universal remote control which are described hereinafter, reference may be had to preferred embodiments shown in the following drawings in which:

FIGS. 10a and 10b illustrate exemplary forms of RFID tags suitable for use with this invention;

FIG. 11 illustrates an exemplary proposed Electronic Product Code for use with RFID tag systems;

DESCRIPTION OF THE INVENTION

Figure 1:
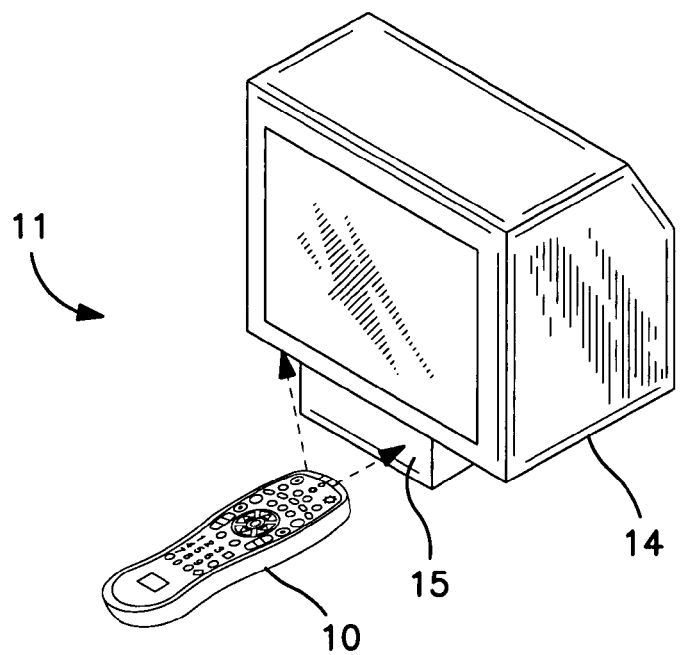
FIG. 1 illustrates an exemplary system wherein a universal remote control provides commands to control functions of a TV set and VCR.
Figure 2:
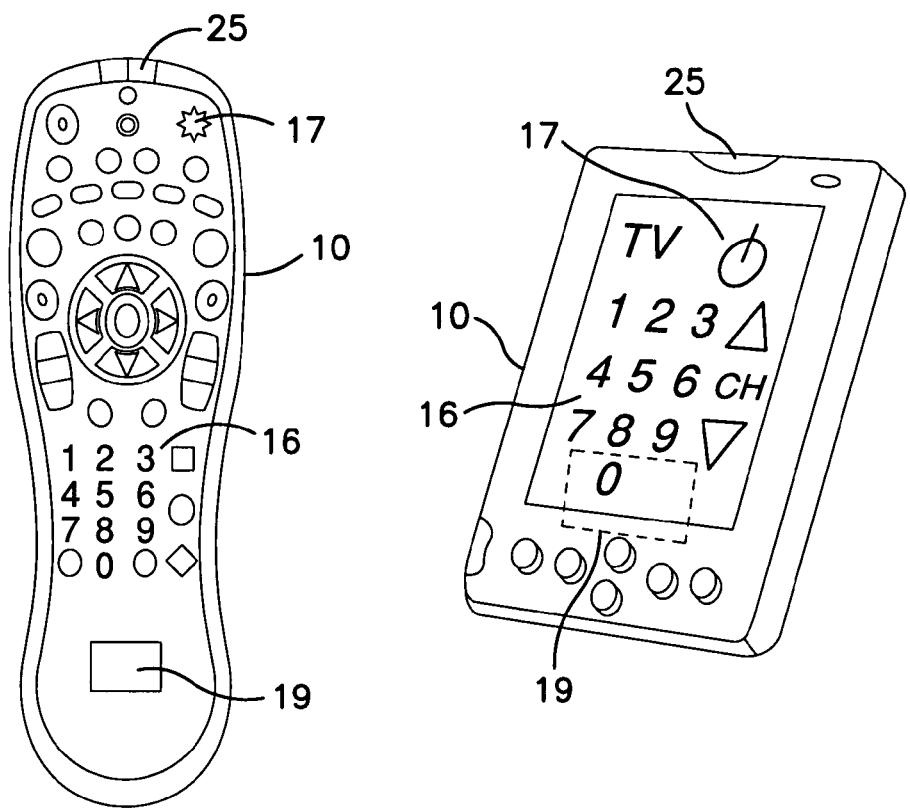
FIG. 2 is a plan view of exemplary, universal remote control units with device activated setup capability.

The following describes various systems and methods for setting up and configuring a universal remote control to command one or more functions of one or more types of appliances of one or more manufacturers. By way of example, FIG. 1 illustrates an exemplary system 11 wherein a universal remote control 10 is provided with appliance activated setup ("DAS") capability whereby the universal remote control 10 may be setup by appliances to command functions of the appliances, illustrated as a TV set 14 and a VCR 15. To this end, FIG. 2 shows exemplary universal remote controls 10 suitable for use in this manner which include a microcontroller 19, a transmitter and a receiver (or transceiver), generally labeled as 25, various command keys, generally labeled as 16, and a power key or button 17, all as is well known. As illustrated, it is to be understood that soft keys displayed on a touch screen could be substituted for or used in conjunction with hard keys. It is to be further understood that communications between illustrated devices may be performed using infrared (IR) transmissions and/or other transmission mediums such as radio frequency (RF), inductive coupling, visible light (e.g., modulating a TV picture signal), etc.

For commanding functions of various appliances, the command keys 16 may include keys for placing the universal remote control 10 into an operational mode to transmit commands to one or more target appliances that have been associated with that operational mode. For example, a "TV" mode key may be activated to place the universal remote control 10 into an operational mode to transmit primarily television function commands, a "VCR" mode key may be activated to place the universal remote control 10 into a mode to transmit primarily VCR function commands, etc. In addition, the universal remote control 10 may have a "home theater" selection which may be activated to place the universal remote control 10 into an operational mode for commanding multiple target appliances within a home theater. In a "home theater" mode, activation of certain command keys cause the transmission of commands to certain predefined or user selectable target appliances, e.g., volume control commands are transmitted to an amplifier, channel control commands are transmitted to a cable box, picture control commands are transmitted to a television, etc. The intended target appliance for individual command keys or groups of command keys within the "home theater" operational mode may be predefined or user programmable.

Still further, the universal remote control 10 may have one or more "room" selections which may be activated to place the remote control 10 into a "room" operational mode for commanding one or more appliances that are or would typically be found within a designated room, e.g., family room, bedroom, etc. In this regard, selection of a "room" may cause target appliances to be assigned to one or more "mode" keys whereupon the universal remote control 10 would operate conventionally in the various operational modes. Selection of the "room" may also function to place the universal remote control 10 into a mode capable of commanding certain function of each of the one or more target appliances located within the selected room, e.g., whereby activation of certain command keys cause the transmission of commands to certain target appliances in a manner similar to the "home theater" operational mode. The intended target appliances in a "room" operational mode may be predefined or user selectable in either case described, i.e., intended target appliances for the "modes" in the former case and intended target appliances for the command keys or group of command keys in the latter case. Further yet, the remote control may have one or more "user" selections which may be activated to place the remote control into a "user" mode whereby remote control configuration information, which is defined according to a specific user's preferences, settings, favorites, etc., may be stored and recalled.

To setup the universal remote control 10 when a consumer, for example, purchases a VCR 15, the system described with respect to FIG. 1 may instruct that the user: a) plug an appliance (e.g., the VCR 15) into a power source; b) hold the universal remote control 10 close to the appliance; and c) press the power button to turn the appliance on. When the appliance then "powers on," the appliance provides device code data to the universal remote control 10 by means of a squawk signal to thereby cause the universal remote control to set itself up to command functions of the appliance.

It is to be appreciated that the squawk signal need not be transmitted solely in response to the appliance being "powered on." Rather, there are other ways to get the appliance to identify itself to the universal remote control 10. For example, an appliance can be equipped with a menu which provides a means for requesting that the appliance initiate the transmission of a squawk signal. Additionally, transmission of the squawk signal can be initiated by having the user hold down a combination of buttons on the front panel of the appliance. Still further, it is possible to simulate the plugging in of the appliance by having some type of master reset button on the appliance.

Figure 3:
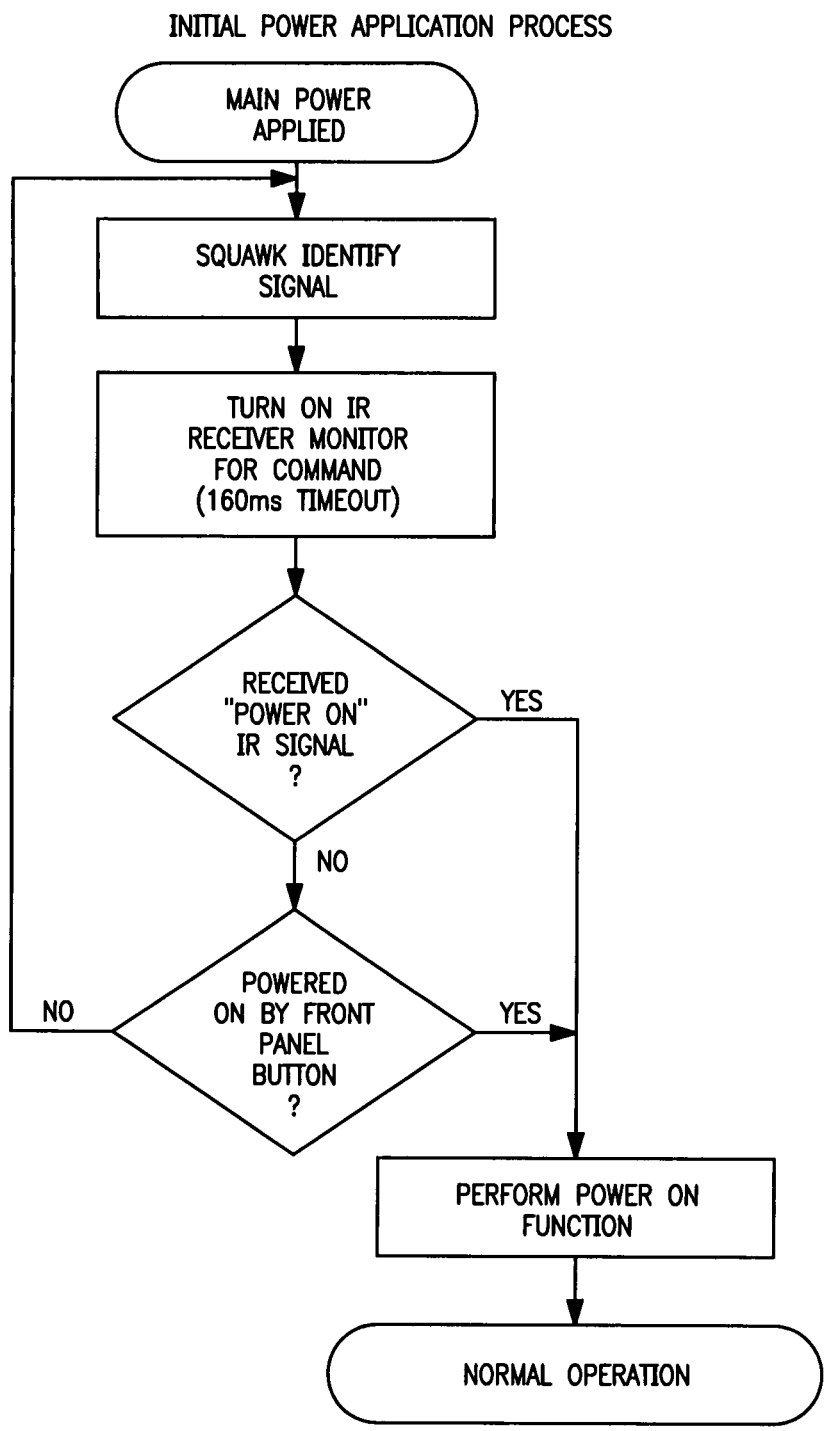
FIG. 3 is a flow chart of an exemplary process for using an appliance to setup a universal remote control.

Turning to FIG. 3, there is illustrated an exemplary method, implementable in software and/or hardware, for generally using an appliance to setup the universal remote control 10 in keeping with the exemplary appliance, initial "power on" squawk transmission methodology previously described. Briefly, in the illustrated flow chart, when AC power is applied to the appliance, the appliance emits an identity squawk signal and then "turns on" its receiver and monitors for a command transmission from the universal remote control 10. If the appliance receives a "power on" command transmission from the universal remote control 10, it performs a "power on" function and proceeds to normal operation, i.e., the universal remote control 10 successfully received the squawk transmission and set itself up to command the appliance. If, however, the appliance does not receive a "power on" command transmission from the universal remote control 10, the program checks to see if power has been manually "turned on" (e.g., by activating a front panel button of the appliance) and, if it has, the appliance performs the "power on" function and proceeds to normal operation. In the case where the appliance has not been manually "powered on," the squawk transmission process may be repeated.

To explain in more detail, the programmed operating logic of the system 11 is such that when an appliance detects that it has been plugged in but has not yet received a "power on" signal from the universal remote control 10, the appliance enters an initialization state and transmits a squawk signal, comprising data that identifies:

a) the type of appliance it is; and b) the remote control encoding format to which it responds. After transmitting the squawk signal, the appliance listens for a period of time for a "power on" command in its specified format.

Figure 4:
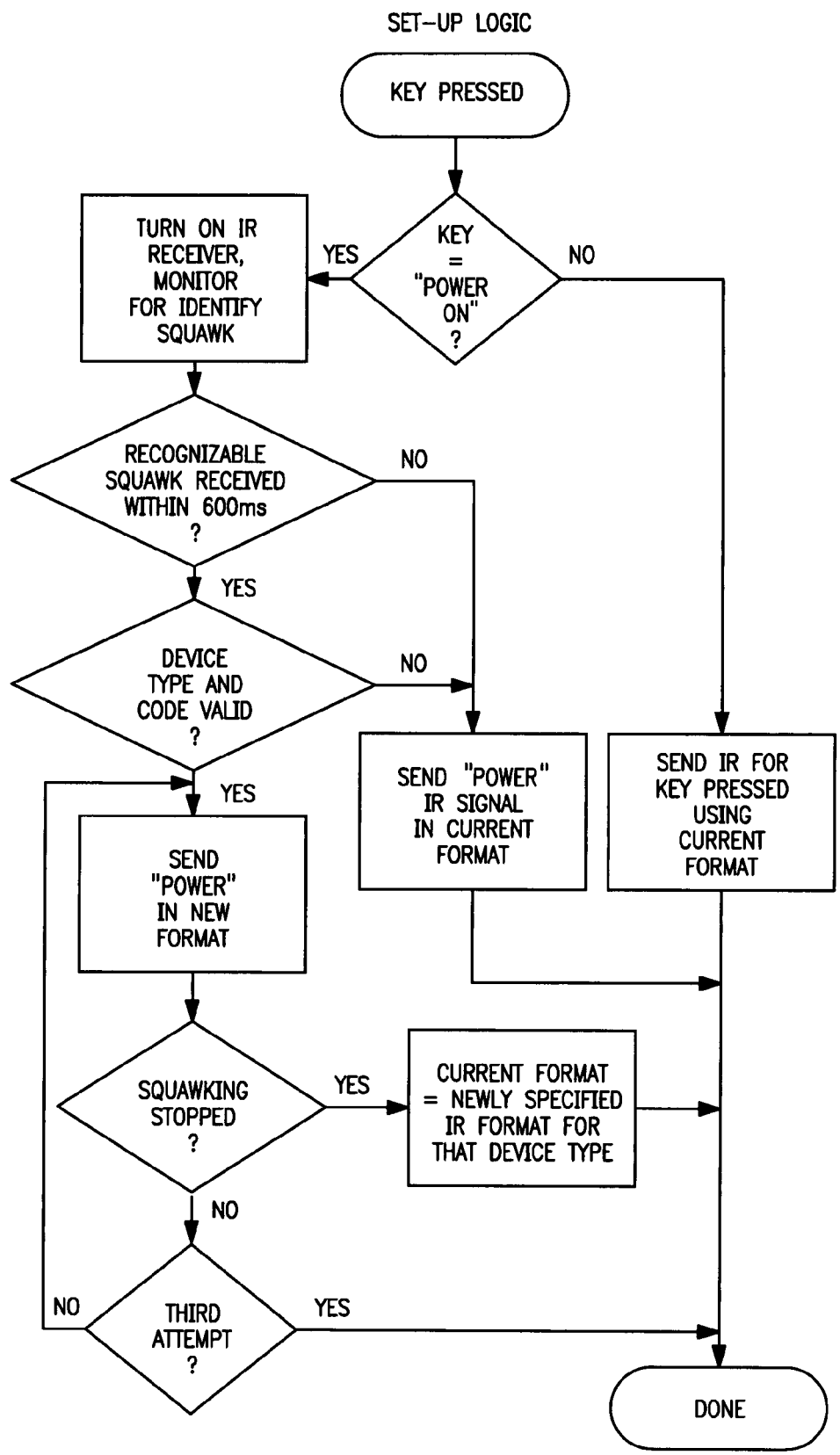
FIG. 4 is a flow chart of an exemplary process for using appliance supplied data to setup a universal remote control.

Referring now to FIG. 4, an exemplary method, implementable in software and/or hardware, for setting up the universal remote control unit 12 is described. To this end, if the user simply presses any key 16, other than the power button 17, on the universal remote control 10, this wakes-up or energizes the microcontroller 19 in the universal remote control unit 10 and causes it to send the appropriate command signal in a conventional manner. In the case where the power button 17 of the universal remote control 10 is actuated (i.e., a specific power button designated for a particular type of appliance or a general power button—which may require the user to actuate a mode button prior to actuating the power button), the microcontroller 19 first briefly places the universal remote control 10 into a receive mode and listens for a squawk signal. If no squawk signal is detected, the universal remote control 10 proceeds to send a power command signal in a conventional manner and, since the "power on" operation generally takes a few seconds, the brief (milliseconds) delay caused by the listening time period is not noticeable to the user.

If the microcontroller 19 of the universal remote control 10 detects a recognizable squawk signal during the listening period, it proceeds to analyze the identification data contained within the squawk signal. If the appliance type and encoding format are supported by the universal remote control 10, the microcontroller 19 commences executing a sequence of instructions that uses the identification data to reconfigure its programming so as to use those command codes appropriate for commanding functions of the appliance and then transmits to the appliance an appropriate response command (e.g., the power command). The command codes appropriate for commanding functions of the appliance may be selected from a library of command codes resident on the universal remote control 10, i.e., the appliance identity data is used to cross-reference a command code set within a preprogrammed library, and/or command codes appropriate for commanding functions of the appliance may be downloaded into the remote control 10 as a function of the identity data—as described hereinafter. In the case where an operational mode for the universal remote control 10 was designated for commanding functions of the appliance, e.g., a "mode" key was actuated in connection with actuation of the "power" key (or a power key pre-assigned to a specific mode—e.g., "TV power," "VCR power," etc. was actuated), the sequences of instructions may also function to reconfigure the programming of the universal remote control 10 such that the appliance will be the primary target of commands when the remote control is placed into the operating mode corresponding to the "mode" key/"mode power" key actuated. Alternatively, appliance type information received from the appliance may be used to automatically assign the appliance to a remote control operational mode.

If the transmission of commands for the appliance is not supported by the universal remote control 10, i.e., the identification data is not recognized, the universal remote control 10 may be programmed to simply remain unchanged in its previous configuration. Again, if no "power on" command is received by the appliance, the appliance may repeat its transmission of the squawk signal and await a response, continuing this alternating squawk/listen sequence until such time as a response is received or a predetermined time period expires. The alternating squawk/listen sequence may also be terminated by, for example, the user pressing a button on the front panel of the appliance or through the receipt of a transmitted command from a dedicated remote control supplied with the appliance. When the squawk/listen sequence is terminated, the appliance exits this initialization state and commences normal operation.

Exemplary data frame layouts and transmission formats for such squawk signals are more completely described in U.S. Pat. No. 6,157,319, entitled "Universal Remote Control System with Device Activated Setup" (of which this application is a continuation-in-part). For the sake of brevity, the disclosure of the '319 patent is hereby incorporated by reference in its entirety.

Still further, data for setting up the universal remote control 10 may also be supplied to the universal remote control 10 through the use of a Radio Frequency Identity ("RFID") system. Various RFID systems are well known in the art, as exemplified by U.S. Pat. No. 3,713,148, entitled "Transponder Apparatus And System" or U.S. Pat. No. 5,438,335, entitled "Responder unit for transponder arrangement." As described in these patents, an RFID system typically includes a "tag" affixed to an object of interest which tag responds to a radio frequency enquiry signal initiated by a reading device. The adoption of a standardized and inexpensive form of RFID tag technology for product identification purposes is promoted by organizations such as the Uniform Code Council (www.uc-council.org) and AutoID (www.autoidcenter.org). For further information regarding exemplary RFID systems, the reader may also consult "Auto ID Technology Guide" (undated) published by the Auto-ID Center, Massachusetts Institute of Technology, 77 Massachusetts avenue, Cambridge, Mass. 02139 or "Auto-ID Technology: MIT's Approach to Standardize Product identification," Thomas Schoch, published Nov. 2, 2002, by the Institute of Information Systems, ETH Zürich, Haldeneggsteig 4, CH-8092 Zürich, Switzerland. It will, however, be appreciated by those of ordinary skill in the art that many possible methods of implementing radio frequency identification systems exist. Accordingly, the term "RFID" as used herein is not intended to be limited to the apparatus and methods described in the above references, but rather should be read in its broadest possible sense.

Turning to FIGS. 10a and 10b, there is illustrated exemplary RFID tags comprising an RF transceiver IC chip 1020 programmed with a product identification, together with a coil 1010 which serves both as an antenna and to gather power from the signal generated by the reading device (i.e., in the case of a "passive" or reader powered tag). The RFID tag 1000 illustrated in FIG. 10a is adapted for use in conjunction with a product label 1030, while the RFID tag 1100 illustrated in FIG. 10b is miniaturized and encapsulated 1040, suitable for incorporation into clothing, etc., or even implantation under the skin as contemplated by, for example, U.S. Pat. No. 5,211,129, entitled "Syringe-implantable identification transponder" or U.S. Pat. No. 6,400,338, entitled "Passive integrated transponder tag with unitary antenna core." Reference may also be had to the (undated) product brochure entitled "Implantable Personal Verification Systems" available from Verichip Corporation at www.4verichip.com.

In FIG. 11 there is further illustrated an exemplary Electronic Product Code (EPC) as proposed by the above referenced AutoID organization for use with RFID tag systems. In the illustrated, exemplary tag, the EPC number comprises a header and three sets of data. The header identifies the version number of the EPC to allow for different lengths or types of EPC in the future. The second field of the number identifies the manufacturer of the product the EPC is attached to, sometimes referred to as the "EPC Manager," The third field, called the "Object Class," refers to the exact type of product, e.g., a Stock Keeping Unit (SKU) or model number. The fourth field is a serial number which uniquely identifies the specific item. It will be appreciated that a 96-bit number, partitioned as described above, will provide unique identifiers for 268 million possible manufacturers each with 16 million possible products (object classes) and 68 billion serial numbers in each product class. Shorter versions of the EPC, for example using a smaller serial number field for products which do not need to be identified down to the individual item, are also possible.

To manage the enormous amount of potential information associated with all the permutations and combinations of the EPC number, it is contemplated by the standards-setting organizations that the first fields of the number (e.g., EPC Manager and, possibly, Object Class) simply serve as a pointer to Internet-based information storage locations. So, in much the same way as a Domain Name Service (DNS) server resolves a URL into a unique physical Internet address, the AutoID organization envisages provision of an Object Name Service (ONS) which will resolve an EPC to an electronically accessible location on the Internet or elsewhere at which additional information regarding the item is available. More details concerning EPC resolution may be found in the above referenced "Auto ID Technology Guide."

Figure 12:
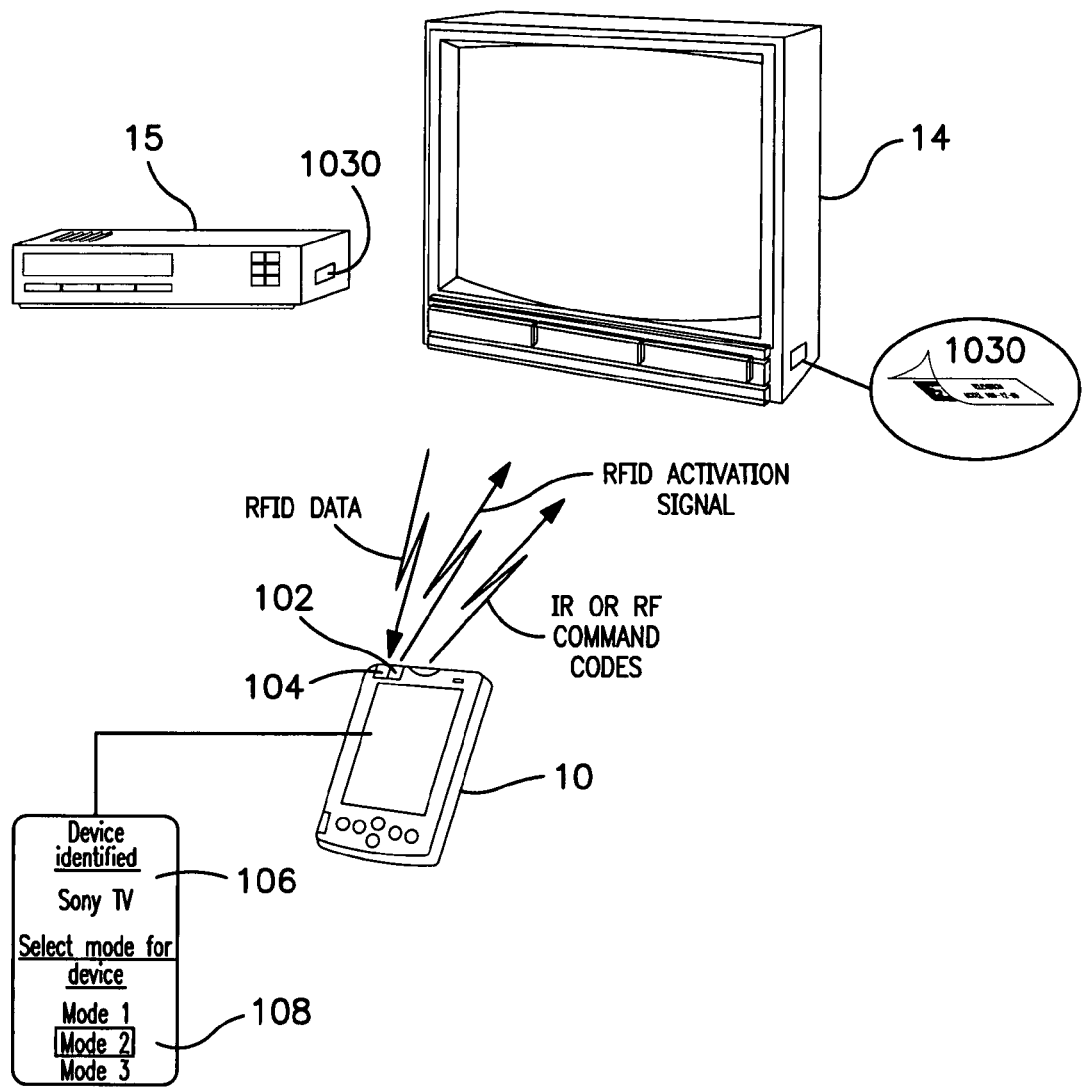
FIG. 12 illustrates an exemplary system for setting up a universal remote control using RFID tag data.

Turning now to FIG. 12, an RFID tag 1030 may be associated with an appliance (e.g., by being placed upon/within the appliance, appliance tag, appliance box, appliance owner's manual, etc) and the universal remote control 10 would include an RF antenna 102 and a receiver (or transceiver) with an associated decoder 104. As will be appreciated, the RFID tag 1030 would be electronically programmed with data that serves as an appliance code to identify the appliance to the universal remote control 10. This data may comprise the Appliance Type data and Appliance Designation Number data as described in U.S. Pat. No. 6,157,319 or U.S. application Ser. No. 09/334,584, a UPC number which has been assigned to the appliance (i.e., it is indicative of the appliance type, manufacturer—and sometimes model of an appliance), an EPC number as described above, or the like, so long as the data is capable of being used to cross-reference command codes in a command code library that are appropriate for commanding functions of the identified appliance. Thus, the universal remote control 10 is adapted to receive the RFID tag data, decode it, and use the data to select command codes to thereby set itself up to command functions of the appliance. In this regard, the remote control 10 may be adapted to immediately select a command code set from a local, internal library of codes based on recognition of a manufacturer and model (e.g., from the EPC Manager and Object Class fields) or may be adapted to use the read data to access a remotely located database of codes, (e.g., using either the standard ONS or a custom service provided by the remote control manufacturer), as will be described in more detail hereinafter.

For retrieving the RFID tag data, the universal remote control 10 may be adapted to emit radio signals that function to activate the RFID tag to thereby read the RFID tag data. For example, the radio signals may be emitted from the universal remote control 10 in response to activation of a "setup" button of the universal remote control. As will be appreciated, the emitted radio waves may range anywhere from one inch to 100 feet or more, depending upon the power output and the radio frequency used and, therefore, the electromagnetic field produced by the antenna 102 can be limited in range so as to allow the universal remote control 10 to control the number of RFID tags to be read, i.e., to limit the number of RFID tags that would be placed into the electromagnetic zone which functions as an activation signal for the RFID tag. Still further, the range of the electromagnetic field may be limited to require that the universal remote control 10 be placed in the near vicinity of an appliance of interest so as to read the RFID tag associated with that appliance while avoiding the reading of RFID tags of other appliances that are not of immediate interest. In this manner, it may be generally ensured that the universal remote control 10 is setup to read the RFID tag of only one appliance to thereby allow the universal remote control 10 to be correctly setup to command functions of that appliance.

In accordance with the setup procedures discussed previously, the appliance identified by its RFID data can be manually or automatically assigned to an operational mode of the universal remote control 10. For example, in connection with the activation of the "setup" key, the user may also select an operational mode, for example by actuating a "mode" key. The identified appliance may then be assigned to the operational mode of the universal remote control 10 that was selected, e.g., identified by the "mode" key actuated. Alternatively, "appliance type" data within the RFID data may be used to automatically assign the identified appliance to an operational mode of the universal remote control 10. In this regard, a mapping between "appliance type" data and operational mode assignments may be pre-programmed or manually setup by a user prior to the appliance identification setup procedure.

It is further contemplated that a graphical user interface may be used to assign identified appliances to an operational mode of the universal remote control 10. For example, as illustrated in FIG. 12, once an RFID tag has been read, a display of the universal remote control 10 may present to the user information 106 indicative of the appliance just identified (e.g., an iconic representation, a textual label, etc.). To this end, the universal remote control 10 may include data that maps the iconic representation, textual label, etc. to the RFID tag data read. In connection with the display of the information 106 indicative of the appliance identified, the graphical user interface may also present operational modes 108 of the universal remote control 10 such that the user may then assign the appliance just identified to one or more of the operational modes of the universal remote control 10. While not intended to be limiting, the operational modes may be presented in a selectable menu. It will also be appreciated that other graphical user interface techniques may also be used to allow the user to assign a just identified appliance to an operational mode such as, for example, using drag and drop techniques, providing check boxes, etc.

It is also contemplated that, in the case where the universal remote control 10 supports a "home theater" or "room" operational mode, the setup process may be performed using multiple steps in the manner previously described (i.e., one mode/one appliance at time) or it may involve the user actuating a "home theater" or "room" selection key (to designate that such "home theater" or "room" mode is to be setup) and then proceeding to individually read the RFID tag for each of the appliances within the home theater center or the room. In either case, the universal remote control will then use read RFID data to thereby set itself up to command functions of each of the appliances of interest. In the latter case, where it is desired to provide one-step global setup for a "home theater" or "room" mode, as each RFID tag is read, or after it has been indicated that all of the RFID tags of interest have been read (for example, by actuating the "setup" key a second time), the remote control may additionally use the read RFID data to assign certain appliances to certain operational modes and/or assign certain appliances as intended targets for command keys within the designated "home theater" or "room" operational modes. Such assignments may be performed manually or automatically using one or more of the techniques described previously.

Provision may also be made for the universal remote control 10 to have a wider reading range to allow for the reading of multiple RFID tags, for example, those of an entire home entertainment center or those within a specific room. In this particular case, the universal remote control 10 would use the RFID data to identify those command codes that are appropriate for commanding functions of each of the appliances whose RFID tag was read. After all of the RFID tags have been read, the remote control may again use the read RFID data to assign certain appliances to certain operational modes and/or assign certain appliances as intended targets for command keys within the designated "home theater" or "room" operational modes. Again, such assignments may be performed manually or automatically using one or more of the techniques described previously.

While generally described in the context of passive RFID tags, i.e., those that operate without a separate external power source and which obtain power generated from an electromagnetic source provided by the universal remote control 10, it will also be appreciated that the RFID tags may also be active, i.e., the RFID tag has an external power source such as a battery. Nevertheless, it is preferred that the RFID tags be read-only tags (which are typically passive) that are programmed with appliance identity data (usually 32 to 128 bits) that cannot be modified.

Figure 5:
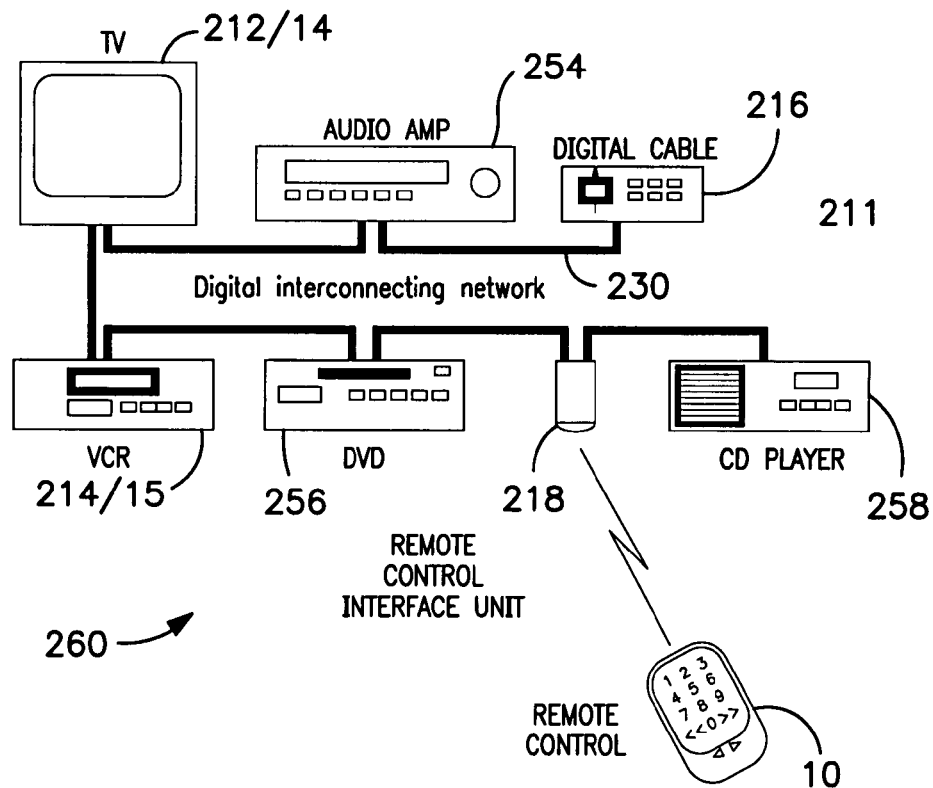
FIG. 5 illustrates an exemplary system of interconnected appliances controllable using a universal remote control.
Figure 6:
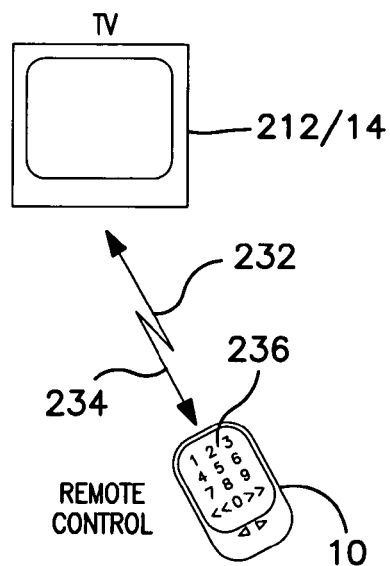
FIG. 6 illustrates an exemplary system for direct, two-way communications between a universal remote control and an appliance.

In a further system, illustrated by way of example in FIG. 5, a universal remote control 10 is provided for controlling an associated home entertainment system 211 including a TV set 212 and a VCR 214 wherein the system components have two-way communication capability. For explanatory purposes, FIG. 6 shows a simplified system wherein a single system component, e.g., a TV set 212, is controlled by the remote control 10. The "Device Activated Setup" (DAS) method described previously may be utilized for the initial setup of the universal remote control 10 and, after this initial setup or concurrently therewith, function identity and operating parameters may be further established by the appliance for the universal remote control 10.

Figure 7:
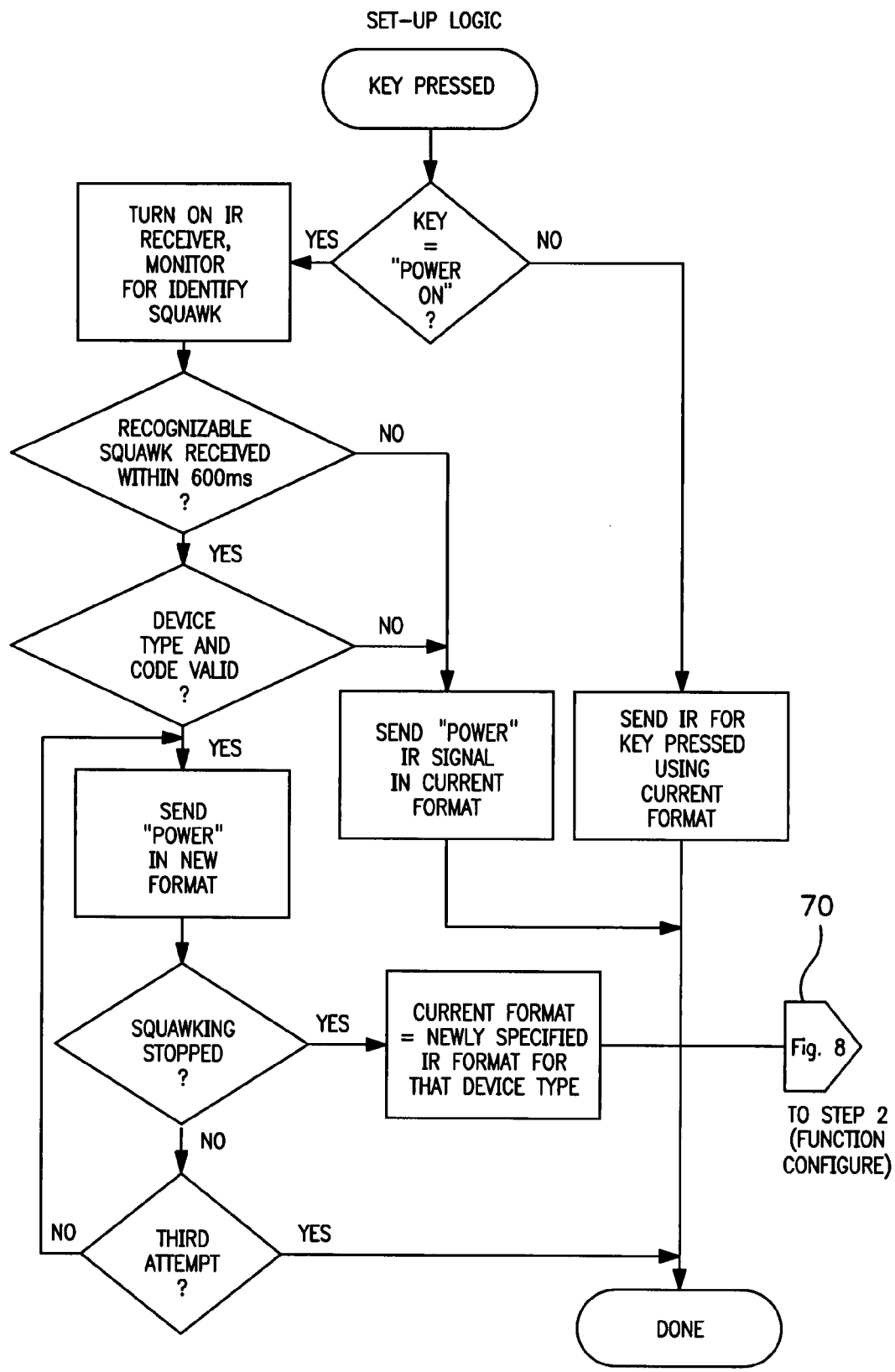
FIG. 7 is a flow chart of an exemplary process for using appliance supplied data to setup and configure a universal remote control.
Figure 8:
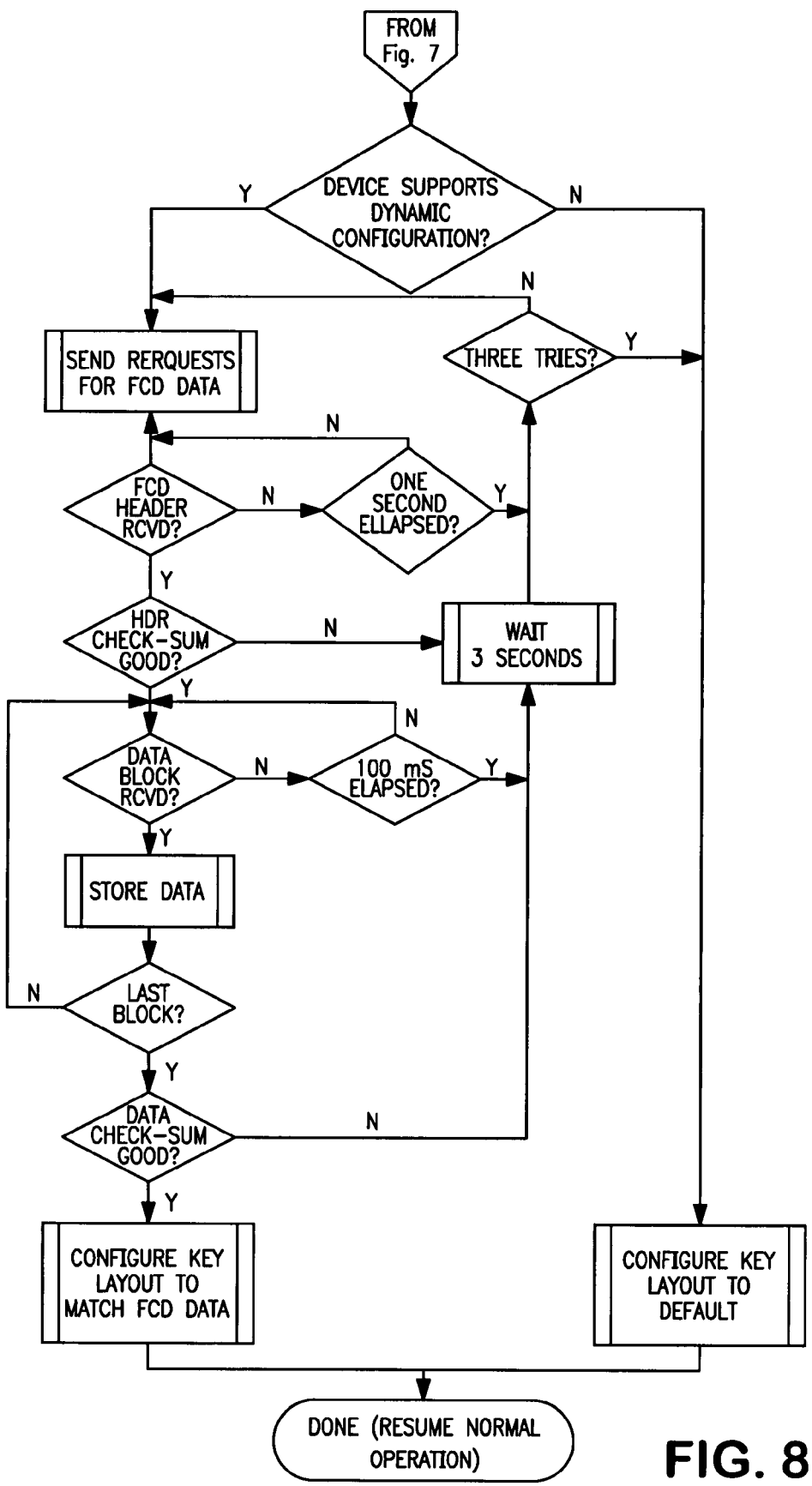
FIG. 8 is a continued flow chart of an exemplary process for using appliance supplied data to setup and configure a universal remote control to command functions of an appliance.

Turning to FIG. 7, there is illustrated in flowchart form, an exemplary method for setting up the universal remote control 10, which may be implemented in software and/or hardware. As illustrated, the "step-2 function configuration" 70, further illustrated by way of flow chart example in FIG. 8, represents an extension of the basic DAS process previously described so as to encompass acquisition of functional capability definition ("FCD") for the appliance to be controlled. To this end, a set of possible functions is defined and each function assigned a unique identifier. Since detailed examples of such function identifiers and exemplary methods for the transmission thereof are given in U.S. application Ser. No. 09/334,584, they will not be repeated herein.

Referring now to FIGS. 9a-9d, exemplary uses of the function identifiers are illustrated. As one example, a simple "playback only" VCR could completely identify its functionality to a universal remote control 10 by sending to the universal remote control functional identifiers defining only the functions shown in FIG. 9a. If a different model of VCR featured recording capability and a channel tuner in addition to the basic capabilities, the identification of the function capabilities of that model to the universal remote control 10 may result in the touch screen display shown in FIG. 9b. Another VCR model having additional features of slow motion capability may send functional capability information which may result in the display illustrated in FIG. 9c. Thus, the functional capability data allows the universal remote control 10 to tailor its presentation of functions to the user (and access to those functions—for use in transmitting corresponding commands) to match the exact appliance being controlled, i.e., the universal remote control 10 may allow access to commands used to control functions actually supported by the appliance and may also prevent the display of command keys for functions not supported by the appliance.

As further described in the above referenced U.S. application Ser. No. 09/334,584, provision may also be made for the definition of entirely new functional capabilities previously unknown to the pre-programmed library of the remote control. By way of example, if the VCR were a dual format deck which allowed the user to switch between playing tapes recorded in NTSC and PAL formats, it might define a NTSC/PAL "format switching" function key 254 to the remote control which may result in the display illustrated in FIG. 9d—the function key 254 providing a means to cause transmission of the "format switching" function command to the appliance. FIGS. 9a-9d thus illustrate how a remote control 10 equipped with an LCD touch screen might adjust its display in response to the functional capabilities of different VCR models.

In the event that the transmitting appliance does not support extended functionality, setup of the universal remote control 10 may be considered to be complete upon completion of a successful DAS procedure, and the system may resume normal operation as shown in FIG. 8. If, on the other hand, the appliance supports capability reporting then the universal remote control 10 may continue by requesting from the appliance its FCD data string. If the universal remote control 10 receives the FCD data successfully, it preferably configures itself as appropriate for operation of that appliance and resumes normal operation. If for any reason the data is not received successfully (e.g., truncated number of packets, bad checksum(s), etc.) the universal remote control 10 may wait an appropriate period of time and then repeat the request. If after three such attempts the data has still not been obtained, the universal remote control 10 may abort the process and revert to default operation—usually, supporting the maximum set of possible functions for that appliance family.

While the example transaction shown above assumes that the DAS and FCD acquisition will usually occur together, there is in fact nothing which prevents the universal remote control 10 from issuing a request for FCD data at any time. Thus, the universal remote control 10 could avail itself of this information at any time. It will also be appreciated that this information may be obtained from a source other than the appliance itself, e.g., from a local Personal Computer or a database accessible via PSTN or Internet, based upon the DAS parameter, UPC number, EPC or other suitable identifying data, by a suitably equipped remote control 10.

The methods disclosed herein with respect to remote control setup are also contemplated to be applicable to Home Audio Video interoperability ("HAVi"), Universal Plug and Play ("UPnP"), and, generally, to other such standards that determine parameter passing and interaction between appliances. In this regard, various standards are being proposed which are intended to provide uniform methods of digital interconnection between appliances. These standards generally specify not only how to transfer audio video source materials, but also how to effect the exchange of control functions between appliances, since it is relatively easy to interleave these different signals on a single interface when they are encoded at the digital level. An example of such standard is the HAVi architecture specification proposed by a group of major appliance manufacturers. The actual physical and electrical connections and the link-level protocols used form the subject of a different specification, IEEE 1394 "Standard for a High Performance Serial Bus." Presently suggested standards are directed primarily to home entertainment appliances, however, the methods disclosed herein are applicable to other appliances in the home such as the control of lighting, personal computers, security, communications, sprinklers and other convenience items.

The HAVi standard allows control information to be transferred between appliances at two levels; the first, referred to as the functional control module ("FCM") interface defines a set of standardized commands for each appliance type (such as play/stop/pause for a VCR appliance, channel change for a TV tuner, etc.). Not all appliances necessarily support all possible commands (e.g., a VCR may not support "indexed skip") so provision is made for an appliance to enumerate its capabilities in response to a query from another appliance on the bus. In the FCM interface method, this enumeration consists of a simple list of which standard functions are or are not supported by the appliance (say VCR); and, the controlling appliance (say remote) determines the look and feel of the user interface. The controlled appliance simply accepts commands from the controlling appliance.

The second method, referred to as the data driven interaction ("DDI") interface, allows the target appliance to specify to the controlling appliance a complete user interface, including the exact icons to display for each function, labels for functions, data and status displays, etc. The controlling appliance simply presents these to the user and reports back to the controlled appliance which icon was selected. In other words, unlike FCM, in this scheme the controlled appliance determines the look and feel of the user interface, the controlling appliance simply acts as intermediary between it and the user.

Referring now to FIG. 5, depicting HAVi compliant appliances, a universal remote control 10 of the type described herein can be utilized by providing an adaptor appliance which attaches to the IEEE 1394 bus. The adaptor solicits capability information from other appliances on the bus and communicates these to the universal remote control 10 via a two-way communication link. In other words, a single HAVi compatible adaptor appliance can provide remote configuration services for all consumer appliances connected to the bus, instead of each one individually supplying its DAS and/or FCD data directly to the universal remote control 10. The universal remote control 10 can issue commands to an appliance either by relaying them back through this same adaptor appliance or by communicating directly with the appliance, whichever is best supported by the appliance in question. The adaptor appliance can be either a "stand alone" unit or incorporated within some other appliance (e.g., cable set top box "STB").

A universal remote control 10 which includes a graphic LCD display and touch screen input capability would be capable of supporting both DAS and FCD command structures. Such a universal remote control 10 would represent an extremely powerful user interface appliance, essentially becoming an extension of the controlled appliance in the user's hand. Also, since the HAVi standard allows an ongoing two-way dialog between the controlled and controlling appliances, the remote control display and configuration can be updated dynamically during use of the system; not just at setup time as is the case with the basic "extended DAS" transaction described earlier.

By way of further example, FIG. 6 illustrates the universal remote control 10 sending a request for information 232 and the TV 12 transmitting information 234 to the universal remote control 10. This setup method may also comprise recognizing a set of function indicators 236 each of which corresponds to a respective function to be controlled from the listing of controllable functions, mapping the functions into specific command codes and keys according to the listing of controllable functions of the appliance, and storing the resultant configuration information for use.

In some cases it is desirable that the step of storing the resultant configuration information include the step of storing the information in the control unit. In some cases the set of function indicators is a single set of respective standard feature indicators, each standard feature indicator comprising a respective icon corresponding to the respective function to be controlled. For example, the Volume-Up and Volume-Down keys corresponding to a TV. It is also desirable in some cases that each respective icon is a unique icon within the single set of respective standard features indicators. This reduces ambiguity and provides the user with quick selection capability.

Figure 9A:
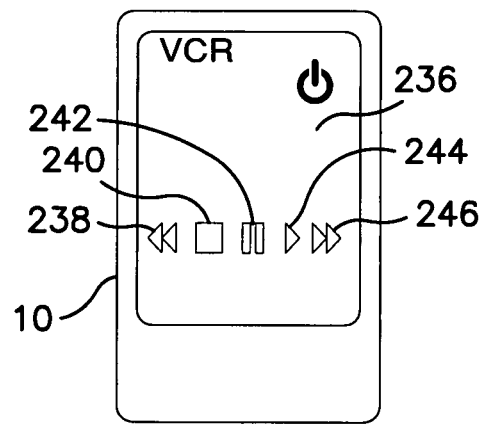
FIGS. 9a-9d illustrate exemplary universal remote control touch screens resulting from the receipt of exemplary appliance function identifier data.
Figure 9B:
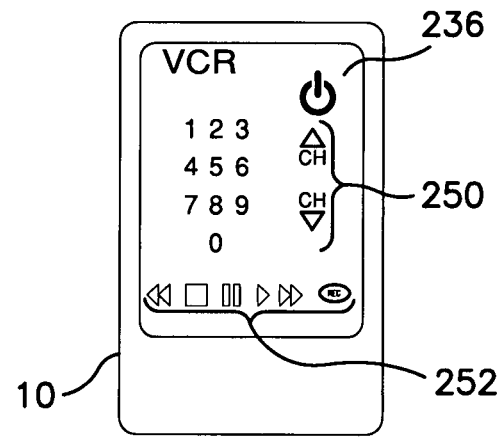
Figure 9C:
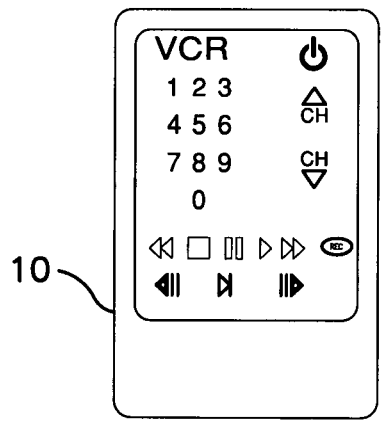
Figure 9D:
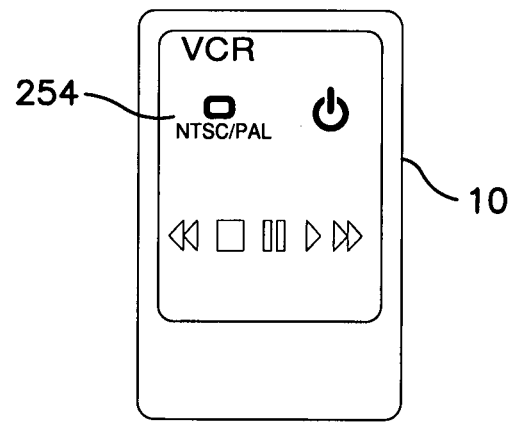

Another method of reducing the complexity of universal remote control 10 includes the step of displaying on the universal remote control 10 only function indicators corresponding to respective functions to be controlled from the listing of controllable functions of the appliance to be controlled. Referring to FIG. 9a, the universal remote control 10 shows function indicators comprising a rewind icon 238, a stop icon 240, a pause icon 242, a play icon 244, and a fast forward icon 246. Since these are the only functions desired to be controlled, for example, with this particular VCR the user is presented with a universal remote control 10 having substantially reduced apparent complexity. This eases selectivity by reducing extraneous information.

It will be understood that the listing of controllable functions may be divided into a plurality of families and the single set of function indicators may be divided into a corresponding plurality of families. Accordingly, the step of displaying may include displaying only the family of indicators corresponding to the family of functions to be controlled. For example, the indicators 236 of FIG. 9b have been divided into a TV family 250 and a VCR family 252.

It will be understood that the step of transmitting may comprise the step of conveying configuration information between the universal remote control 10 and the appliance to be controlled (also referred to herein as a target appliance) via an encoding scheme in a communications protocol. It will often be desirable to utilize an industry standard protocol and it will often be desirable to provide compatibility by utilizing a consumer electronics standard for the universal remote control 10 and for the interface appliance communication. As discussed earlier, one consumer electronics standard is a HAVi standard.

The set of variable functions may be defined for each appliance to be controlled and the unique numeric identifier may be assigned to each function. It may be desirable to group the related variable functions under a single designator. It is often desirable to reserve at least one code for indicating that data following the code is a definition of a new IR code and corresponding key annotation.

Referring once again to FIG. 5, the method may also be utilized in a control system 260 of electronically controlled appliances. In one case, the system may comprise a standard high performance bus 230 connecting the electronically controlled appliances. For example, FIG. 5 shows the electronically controlled appliances constituting a home entertainment system 211 including a VCR 214, a TV 212, an audio source 254, a DVD 256, and a CD player 258. In the system shown in FIG. 5, the universal remote control 10 communicates with the electronically controlled appliances via the interface unit 218. FIG. 6 shows a system wherein the universal remote control 10 communicates with the electronically controlled appliances directly.

Generally, although not required, the interface adaptor 218 is mechanically and electrically connected to the bus 230. In some select cases the bus 230 is a high speed digital serial bus which utilizes a communications standard consistent with the home audio-video interoperability (HAVi) standard. Accordingly, it is generally desirable for the universal remote control 10 to be adapted to issue user commands to one of the appliances through the interface adaptor.

The control system may also comprise a plurality of appliances connected via a bus conforming to a first standard, wherein the appliances communicate according to a second standard. For example, the plurality of the appliances include a target appliance having data driven interaction data (DDI Data), that is context determined data, defining a plurality of functions supported by the target appliance and a plurality of associated icons. An adaptor is placed in operable communication with the bus to receive the DDI Data from the target appliance and send the DDI Data to the target appliance. A universal remote control 10 is placed in operable communication with the adaptor to send and receive the DDI Data. In some specific embodiments the bus is a serial bus, and the first standard is an IEEE 1394 standard. It may be desirable to have the target appliance configure the universal remote control 10. It is also often desirable for the universal remote control 10 to comprise a display wherein the target appliance displays at least one of the plurality of associated icons on the display. The universal remote control 10 often comprises at least one configured function defined by the target appliance and a display displaying an icon standard with at least one configured function.

It will often be desirable for the adaptor to comprise means to identify itself to the target appliance as a unit having display and control input capabilities, even though the adaptor does not provide display and control input capabilities. This allows the adaptor to act as a conduit between the target appliance and the universal remote control 10, wherein the universal remote control 10 does have display and controlling capabilities.

It will be understood that a system may comprise a two-way wireless link connecting the adaptor and the universal remote control 10. In some cases it is desirable for the wireless link to include a radio frequency link or an infrared (IR) link. While the adaptor 218 has been shown separate from the plurality of appliances connected via the bus 230 for ease of illustration, it will be understood that the adaptor 218 may be housed in one of the plurality of appliances. Similarly, each appliance may be configured to include an adaptor 218 (or similarly functioning element) and a two-way wireless link such that communication between the appliances, and between each appliance and the universal remote control 10 may be accomplished.

As stated above, the second standard may be a HAVi standard and the first standard may be an IEEE 1394 standard. It is often desirable to provide the universal remote control 10 with a dynamic-graphical-user interface connected to change display graphics according to a status of the target appliance. The universal remote control 10 may also comprise a means for receiving the status of a target appliance from the target appliance through the adaptor. The universal remote control 10 may further comprise means for directly controlling the target appliance. Thus, the icon may be dynamically altered in response to communications with one of the appliances.

It will also be appreciated that FCD data may be transferred to the universal remote control 10 through the use of RFID tags. In some cases the RFID tag data may include the FCD data as well as the DAS data (or may include FCD data alone), while in other cases the RFID tag data may be used as an index or address pointer to a repository (local or distant) from which the FCD data may be obtained, e.g., via use of an ONS server. The universal remote control 10 may then respond to the RFID tag data to not only setup the universal remote control 10 to generally control functions of an appliance, but may also cause the universal remote control 10 to identify specific functions that are to be commandable from the universal remote control 10. Specifically, RFID tag data may indicate to the universal remote control 10 one or more specific functions that are supported by the appliance, one or more groups or families of functions supported by the appliance, IR code data for commanding one or functions supported by the appliance, etc.

Figure 13:
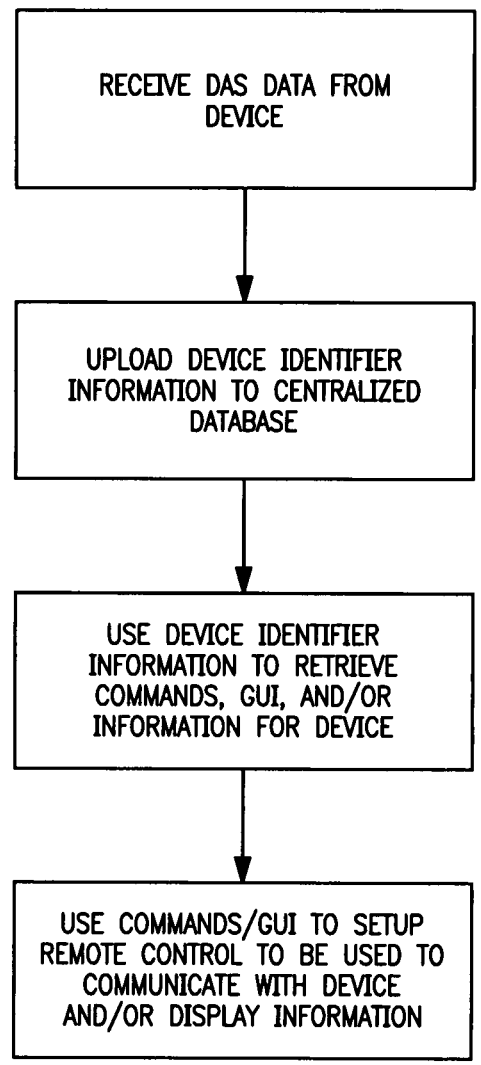
FIG. 13 is a flow chart illustrating an exemplary process for setting up a universal remote control utilizing remotely stored configuration data.

In certain cases, it will also be appreciated that the universal remote control 10 need not have a locally stored library of command codes that are accessed to setup the universal remote control 10 in response to receipt of either DAS and/or FCD data (for example, received from an RFID tag). In the case where the universal remote control 10 presents soft keys that are actuatable to command functions of an appliance, icons used to depict the function command keys, especially in the case where the icons are selected in response to received FCD data, also need not be maintained locally with the universal remote control 10. Rather, the universal remote control 10 may be adapted to use received DAS and/or FCD data to downloaded needed command codes and/or icons from a data repository remote from the universal remote control 10, as generally illustrated in the flowchart of FIG. 13 and described in more detail hereinafter.

It is also contemplated that RFID tag data may be used to provide information that may be used to identify a particular individual, for example, in the case where an RFID tag is associated with an individual by being implanted within the individual, by being included in an article of jewelry, a medic alert bracelet, or article of clothing worn by the individual, etc. In such a case, the universal remote control 10 of FIG. 19 or 20, for example, may be adapted to read the RFID tag data 1100 that identifies the individual for the purpose of causing the universal remote control 10 to set itself up according to preferences that have been specified for that individual. Without limitation, the universal remote control 10 may be configured to recognize individuals to cause the universal remote control 10 to be placed into an operational mode specified as a preference for that individual, to display soft keys for commanding functions of appliances specified as a preference for that individual, to assign target appliances to command keys specified as a preference for that individual, to assign channel numbers to a "surf" or favorites lists specified as a preference for that individual, to allow access to certain features offered by the remote control 10 (e.g., according to parental control parameters established for that individual) or otherwise tailor the presentation of any displayable objects, information, etc. according to a specified preference for that individual.

It is additionally contemplated that the universal remote control 10 may store the RFID tag data that serves to identify an individual whereby the remote control 10 may forward the data to one or more of the appliances and/or a remote data repository—for example associated with a data collection agency. In this regard, the RFID tag data that serves to identify the individual may be included as part of a command code transmission to an appliance and/or may be transmitted to an appliance in its own data frame. In either case, the RFID tag data may then be used by the appliance to similarly cause the appliance to enter a mode of operation that has been established as a preference for that individual. The mode of operation may include the manner in which an appliance is commandable and/or content is accessible (e.g., V-chip settings, "surf" or favorites lists, program guide information, etc. being mapped to individuals), the manner in which content is presented (e.g., surround sound settings, closed captioning options, television color/tint/brightness, appliance interoperations, etc. being mapped to individuals), and the like. The RFID data that identifies a particular user may also be used to track user access to content provided on an appliance for the purpose of, for example, creating user profiles to tailor what content is accessible or the manner in which content is presented. In this case, the RFID data that identifies a particular user may be locally stored and used solely by the appliance or may be uploaded to a more centralized data repository, for example, to a cable head end system.

It will be appreciated that for purposes of appropriately recognizing and distinguishing from among multiple individuals having RFID tags in close proximity with each other in order to correctly display specific operational modes, user preferences, favorites, etc. on universal remote control 10, the various methods set forth above in conjunction with detection of specific desired appliances may be used. For instance, the power output and/or radio frequency (and thus the electromagnetic field) produced by the antenna 102 can be limited in range so as to allow the universal remote control 10 to control the number of RFID tags to be read, i.e., to limit the number of individual RFID tags that would be placed into the electromagnetic zone which functions as an activation signal for the RFID tag. Additionally, a recognition by the universal remote control 10 of the varying signal strengths from multiple individuals having RFID tags may be used to trigger the display of user operational modes, preferences, favorites, etc. associated with the RFID tag having the strongest signal (thus indicating which RFID tag is likely closest to the universal remote 10).

Figure 19:
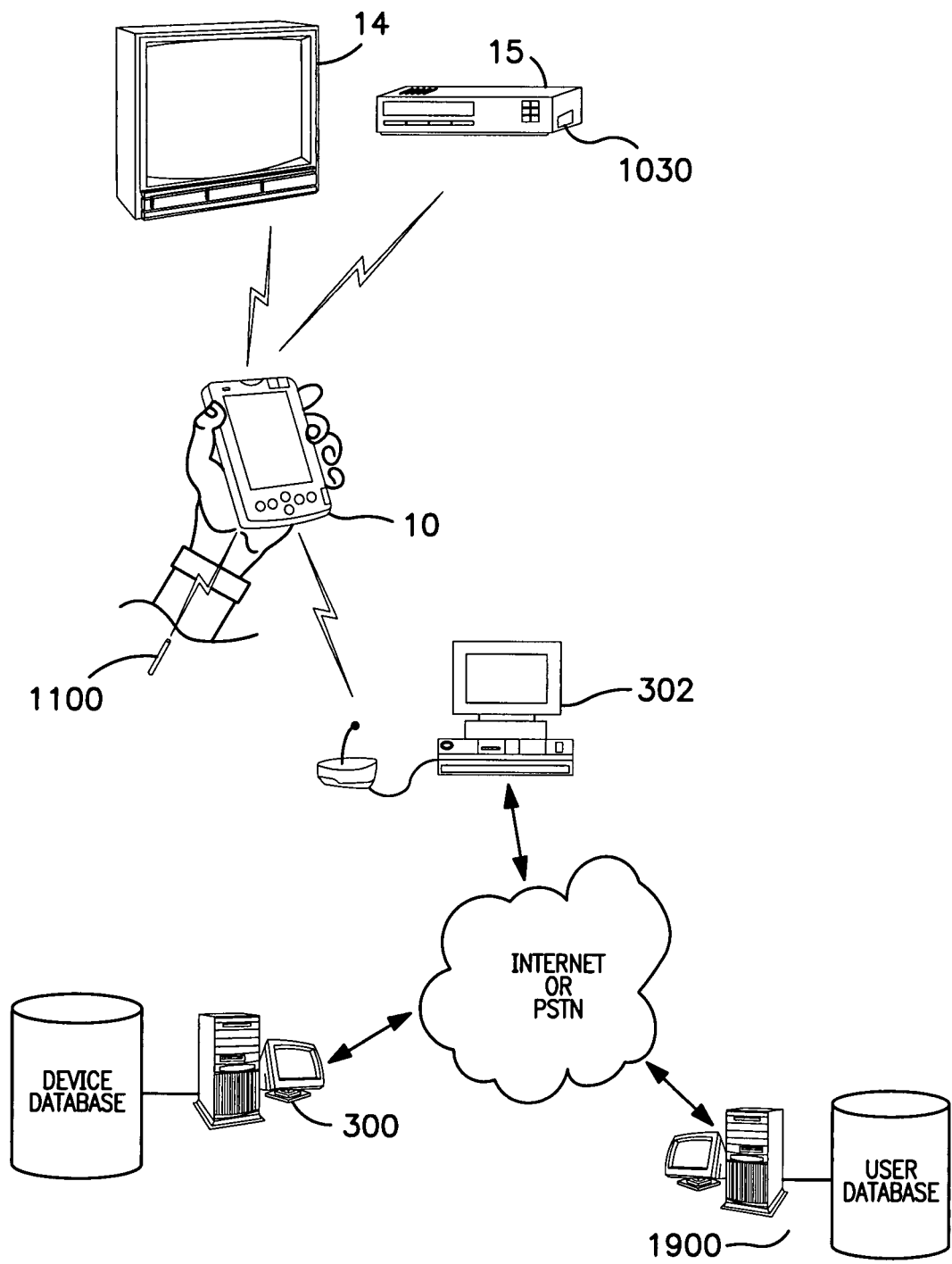
FIGS. 19 and 20 each illustrate an exemplary system for using RFID tag data that identifies an individual for the purpose of causing a universal remote control to set itself up according to preferences that have been specified for that individual.

In some instances, it will be appreciated that it may not be necessary that the data for commanding functions of an appliance, for use in displaying soft keys, or for otherwise setting up the universal remote control 10 be locally stored on the universal remote control 10. Rather, the universal remote control 10 may be adapted to use DAS data, RFID data, FCD data, or the like to obtain such data from a remote data repository. For example, devices such as personal computers and the like which have communication capabilities that extend beyond the home may be attached to a network, as illustrated in FIG. 19. In this case, provided that the minimum data required to identify a device type and model, command function, etc. can be obtained via DAS, RFID, direct user input, or the like, the remote control 10 may use the personal computer as a intermediate client to access a remote data repository and obtain from the remote data repository capability and configuration data necessary to setup the universal remote control 10 to control an appliance.

Figure 14:
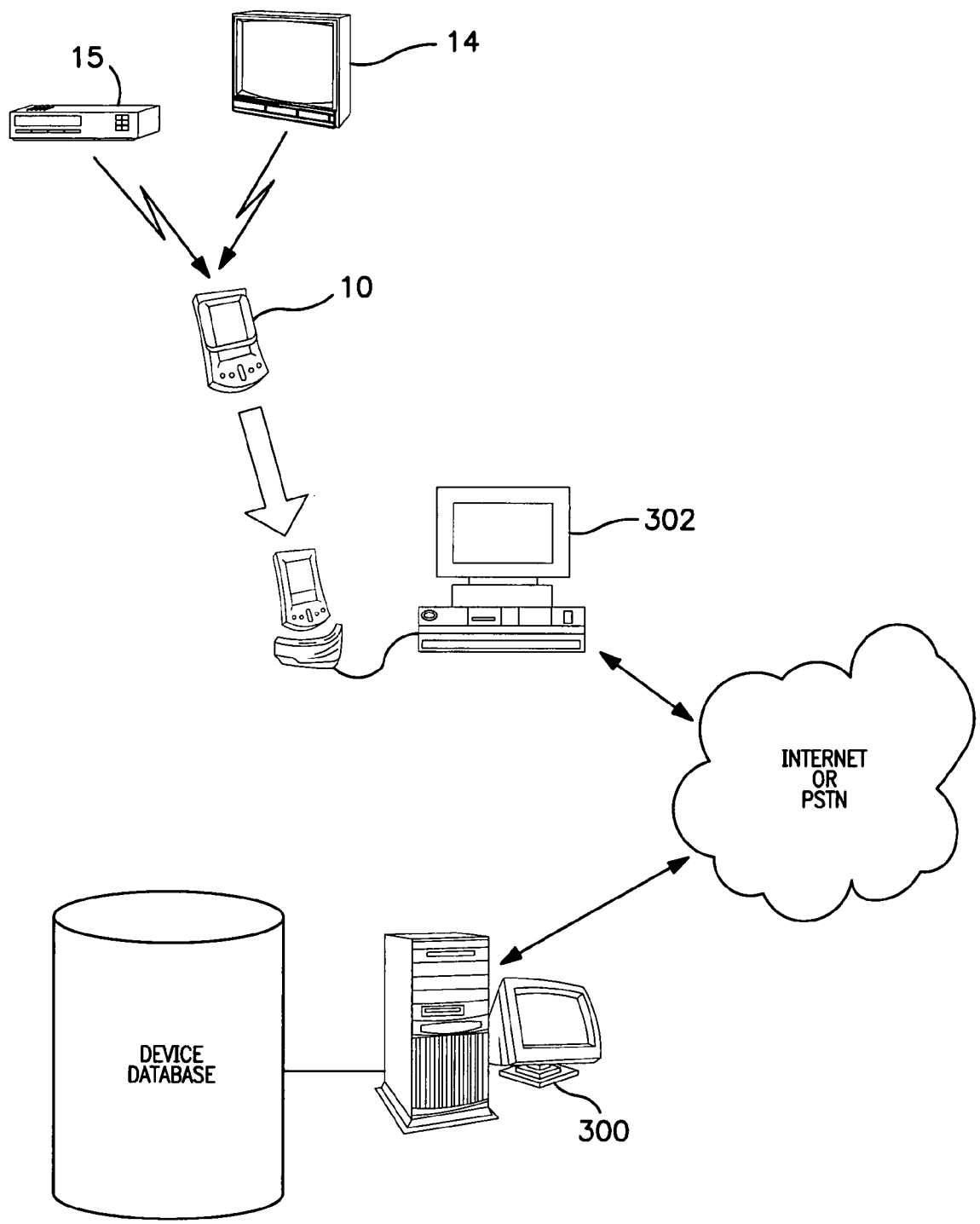
FIG. 14 illustrates an exemplary system for linking a universal remote control to a remote data repository utilizing an intermediate personal computer and a docking station.

More specifically, device and function identity information, whether included in a DAS transmission, FCD transmission, RFID tag, read from a barcode label (as described in U.S. Pat. No. 6,225,938 which is incorporated here by reference in its entirety), entered by the consumer as a UPC or other code, etc. may, in turn, be used to directly access data stored in a centralized device database that contains definitions necessary to configure the universal remote control 10 to communicate with and/or control the identified appliance generally and/or specific functions of the identified appliance. To this end, the centralized device database may include control codes for appliances of different types and manufacturers (and sometime model number) as well as elements of graphical user interface layouts to be displayed by the universal remote control 10 as an interface to communicate with/control various appliances (in the case where the universal remote control 10 supports a touch screen). As illustrated in FIG. 14, the universal remote control 10 can access the centralized device database server 300, provide the centralized device database server 300 with the device and/or function identity information, and request that the centralized device database server 300 download to the universal remote control 10 information from the centralized device database needed by the universal remote control 10 to configure itself to communicate with and/or control the appliance corresponding to the device identity and/or function identity information. As will be described in greater detail hereinafter, the centralized device database may also store information relevant to the operation of appliances such as user manuals, TV-guide listings, etc. Additionally, the identity information provided to the centralized device database server can be used to provide services such as automatic warranty registration, capturing of demographics (e.g., identifying devices a user owns/has previously setup), etc. These latter describes services may also utilize RFID data that functions to identify a particular individual.

For use in downloading data to setup the universal remote control 10, the device and/or function identity information supplied to the universal remote 10 for the purpose of setting up the universal remote control 10 may be stored in memory of the universal remote control 10 to thereby allow the information to be read from the memory and communicated to the centralized device database server 300 during an on-line communications session. Alternatively, the device/function identity information may be uploaded from the universal remote control 10 into an intermediate client device 302, such as a personal computer, set top box, etc. for future off-line communication to the centralized device database server 300. Similarly, the data returned from the centralized device database for use in the universal remote control 10 can be loaded into the memory of the universal remote control 10 during an on-line communications session or this information can be downloaded to the intermediate device 302 for subsequent, off-line downloading into the memory of the universal remote control 10.

Figure 15:
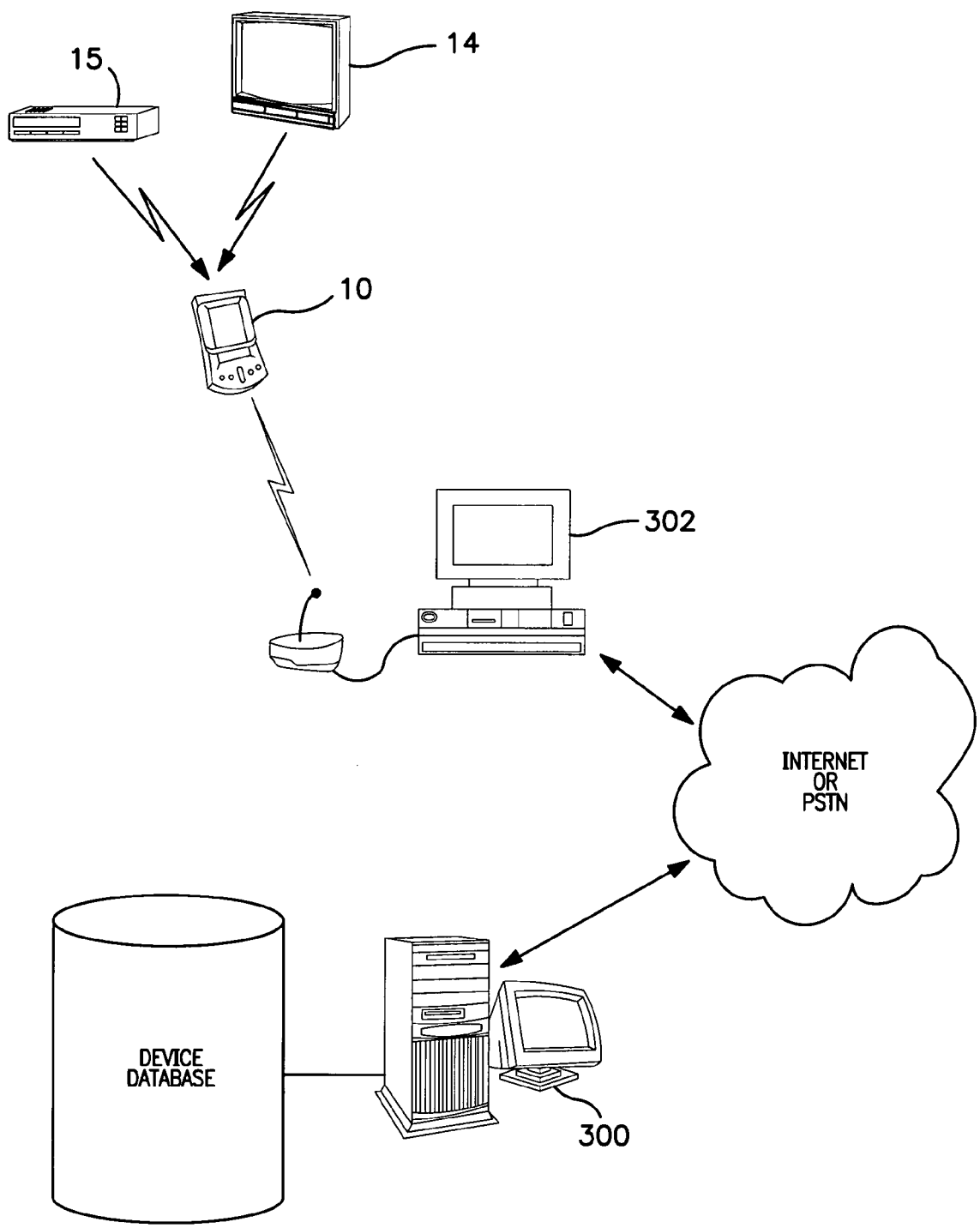
FIG. 15 illustrates an exemplary system for linking a universal remote control to a remote data repository utilizing an intermediate personal computer that is accessible via wireless connection.
Figure 16:
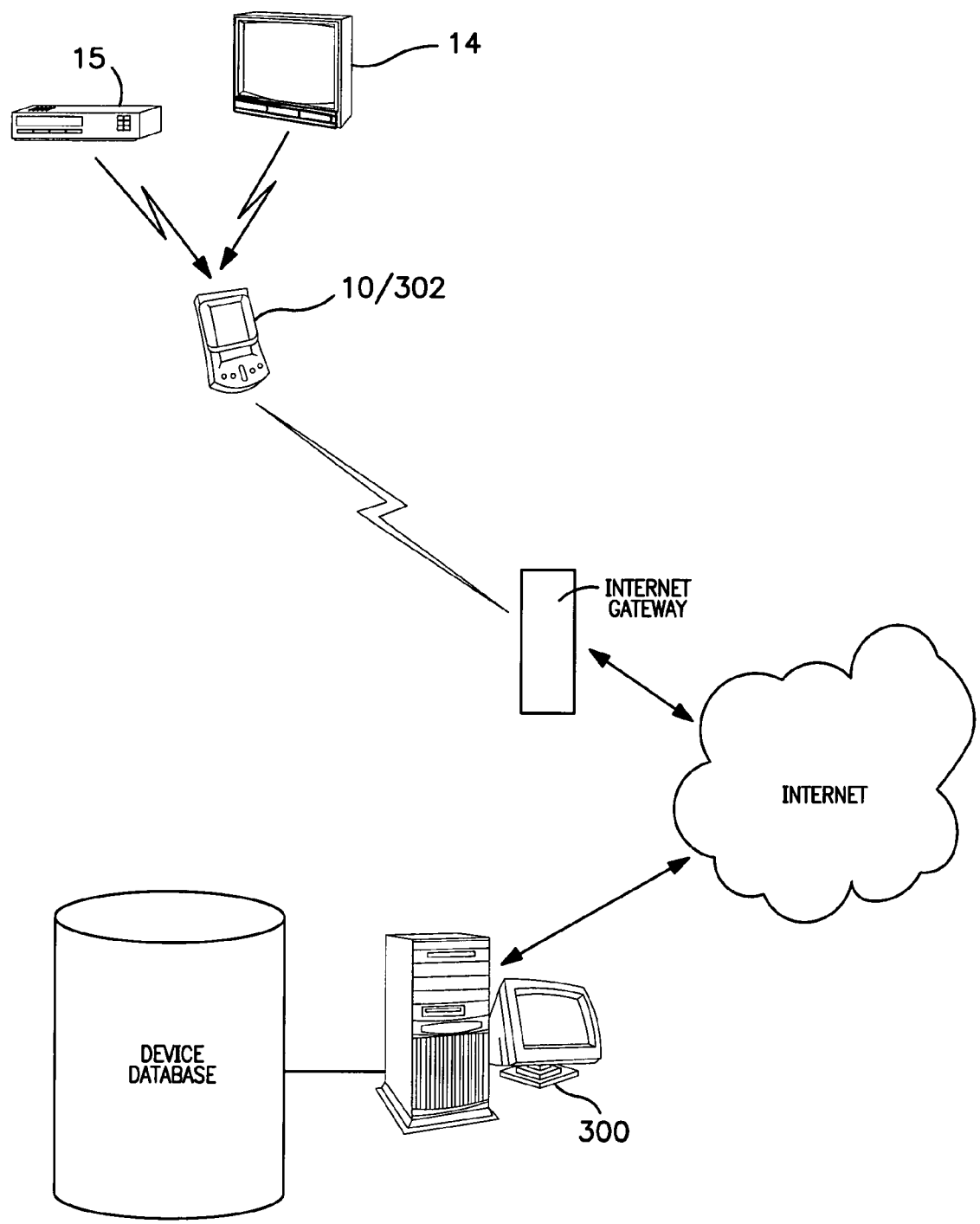
FIG. 16 illustrates an exemplary system for linking a universal remote control with a remote data repository utilizing an intermediate Internet gateway that is accessible via wireless connection.
Figure 17:
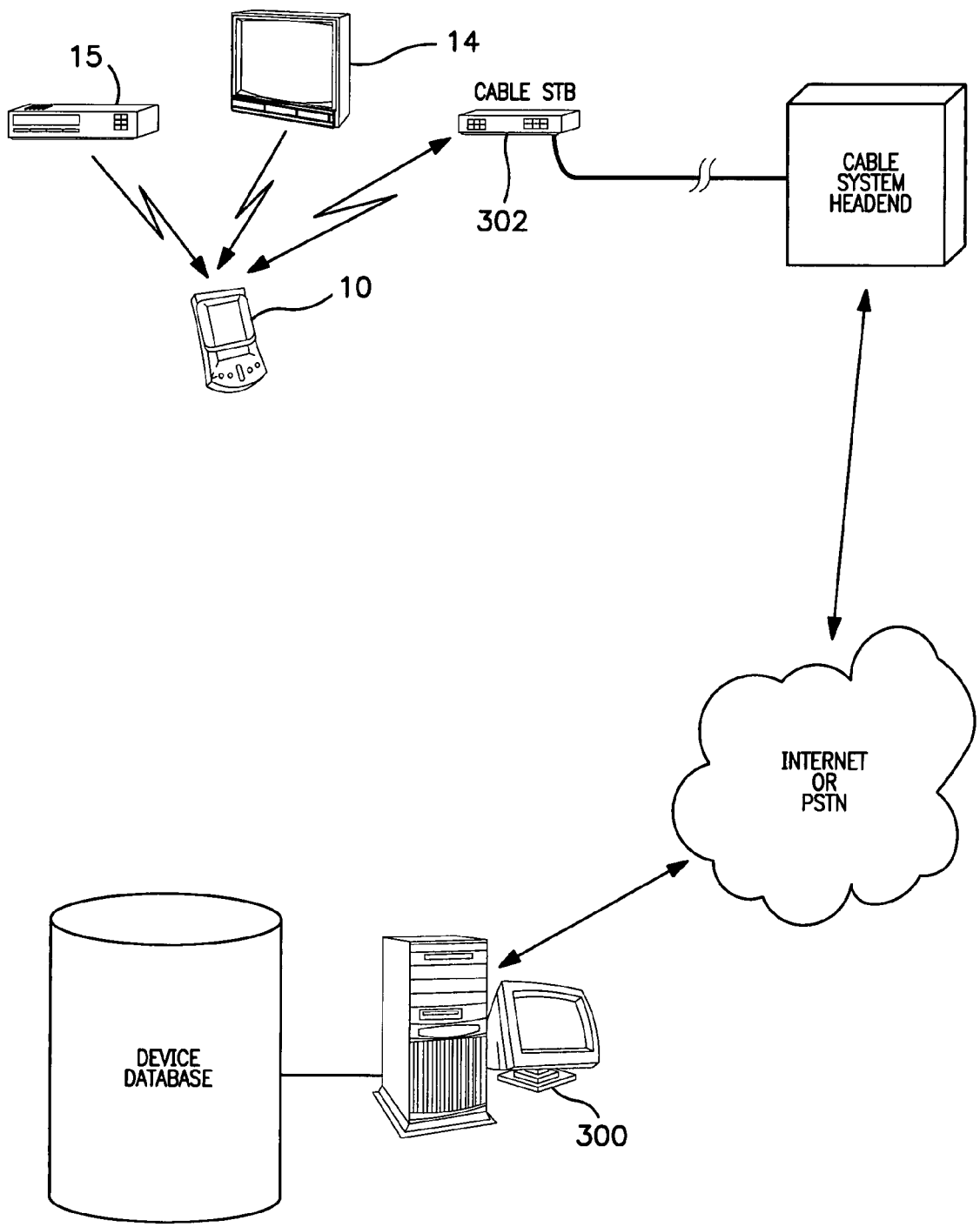
FIG. 17 illustrates an exemplary system for linking a universal remote control with a remote data repository utilizing an intermediate cable set top box that is accessible via wireless connection.
Figure 18:
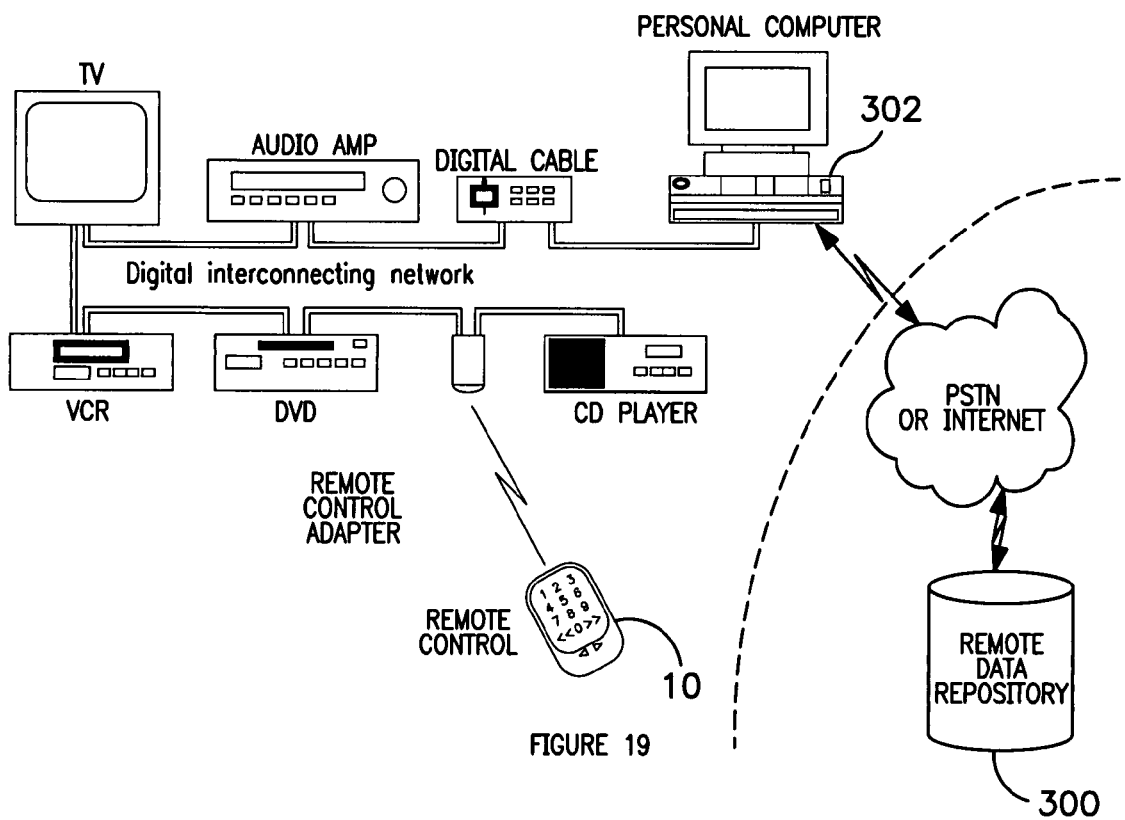
FIG. 18 illustrates the networked home theater system of FIG. 5 including a personal computer for linking the networked home theater system to a remote data repository.
Figure 20:
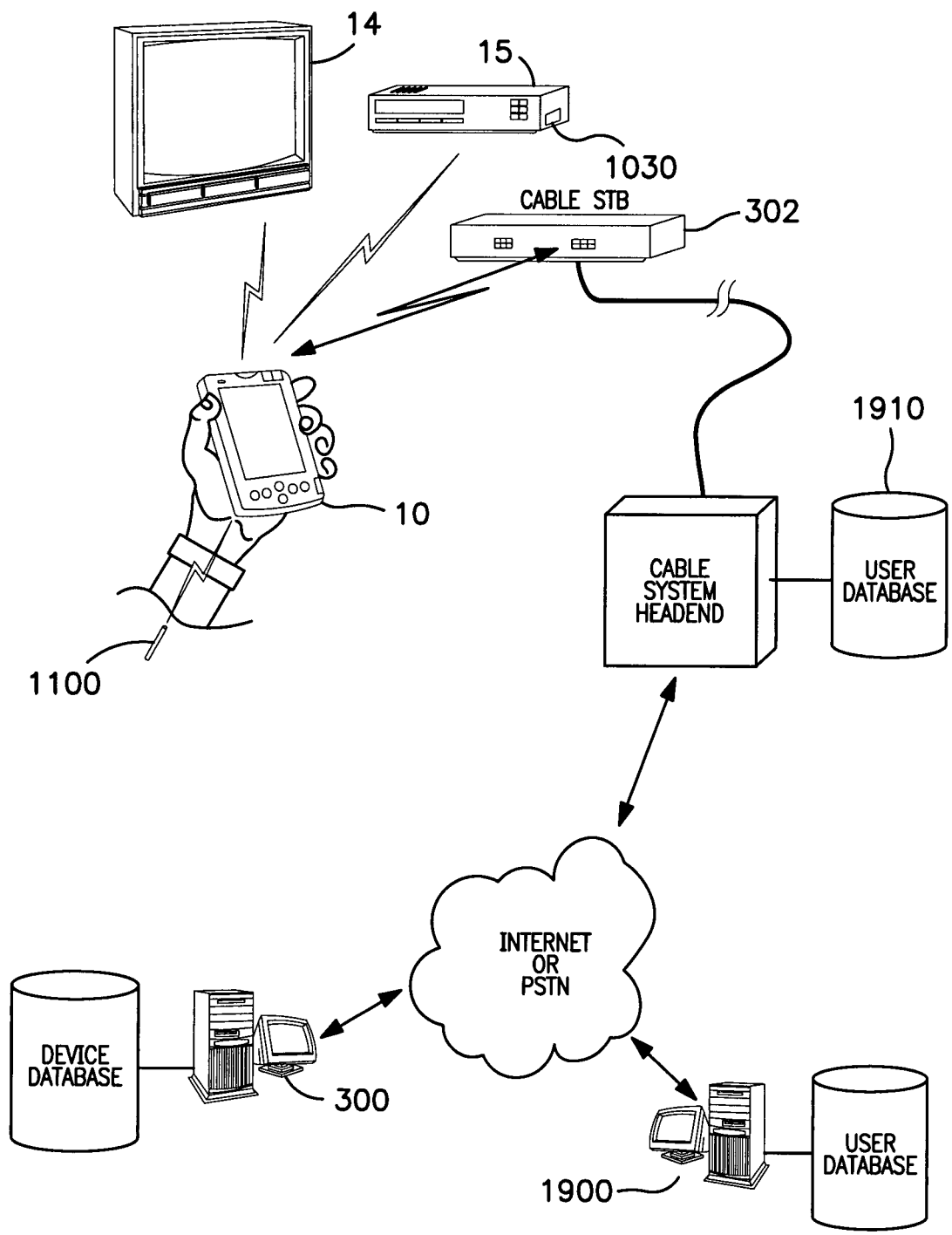

To upload the identity information to the centralized device database server 300, as illustrated in FIGS. 14-18, the universal remote control 10 may be placed in communication with a client device 302 which, in turn, is capable of communicating with and accessing the centralized device database server 300. Access to the centralized device database server 300 may be via direct connection or via the Internet, PSTN, or other network. By way of example, the client device 302 can be a personal computer as illustrated in FIGS. 14, 15, 18 and 19 or a cable set top box as illustrated in FIGS. 17 and 20. Still further, the client device 302 can itself be the remote control, as illustrated in FIG. 16, when the remote control functionality is embodied in a PDA, Webpad, personal computer or the like, having the ability to directly access the Internet. Communications with the client 302 can be by means of a docking device 304, as illustrated in FIG. 14, or by means of RF wireless communications, using protocols such as 802.11, Bluetooth, etc., as illustrated in FIGS. 15 and 19. Still further, communications with the client 302 can be accomplished using bi-directional IR transmissions, as illustrated in FIGS. 17 and 20.

To communicate with the centralized device database server 300, the client device 302 can include software that is designed to monitor for data messages from the universal remote control 10 and initiate contact with the centralized database server 300 when the universal remote control 10 indicates that it possesses a new device or function identity for processing. Preferably, this software runs in a background mode. The software can be responsive to a transmission from the universal remote control 10 which notifies the software of the fact that the universal remote control 10 includes new setup information. This notification can include data representative of the new device or function identity or the software can request that the new device or function identity be supplied in a further transmission. Still further, the software can periodically read the memory of the universal remote control 10 to determine if there has been a change in the device identity data stored in memory. This is especially useful in the case where the universal remote control is a PDA, PDA-like device, or Smart Display, used in conjunction with a personal computer as is possible in the examples shown in FIG. 14, 15 or 19, where the software could form part of the synchronization process which is automatically invoked whenever the portable device is docked or otherwise establishes communication with the host PC. A similar arrangement may be used in the case of a universal remote control 10 which is equipped to display TV guide information (as described, for example, in co-pending U.S. application Ser. No. 09/905,396 or in U.S. Pat. No. 6,130,726) wherein the universal remote control 10 engages in periodic communication with a PC client device 302 in order to refresh guide data. In cases where the client device 302 is not a PC but is a cable or satellite set top box, home gateway appliance or the like, an embedded application may be installed in the device to perform in a similar manner.

Upon receipt of the identity information from the universal remote control 10, the centralized device database server 300 uses the identity information to select from a command code library stored in the centralized device database one or more command codes and transmission formats recognizable and appropriate for the identified device and/or function. This data is then returned from the centralized database server 300 to the client device 302 whence it may be transferred directly back to the universal remote control 10 if the universal remote control is still in communication with the client device 302. Alternatively, the data may be stored on the client device 302 for later transfer to the memory of the universal remote control 10 during a subsequent docking or communication session with the universal remote control 10. Once the data is transferred to the universal remote control 10 the data is used in a manner well known to those of skill in the art to setup the universal remote control 10 to control the operation of the appliance and/or the identified function.

Provision may also be made to allow the universal remote control 10 to determine if the universal remote control 10 has sufficient memory to accept any data to be downloaded. To this end, the universal remote control 10 may include a diagnostic routine that determines the size of an EEPROM into which data is to be downloaded and/or memory that would be available within the EEPROM for accepting data. Execution of the diagnostic routine may be automatic, for example, as part of the normal downloading process or may be manually initiated, for example, in response to activation of one or more predetermined hard or soft keys of the universal remote control 10. Information concerning the overall size of the EEPROM and/or memory available within the EEPROM can be presented to the user, for example, by being presented in a display, by using an LED to blink a signal to the user that is indicative of the information, etc. By way of further example, an EEPROM size of 512 bytes could be represented by the LED blinking twice, an EEPROM size of 1K bytes could be represented by the LED blinking three times, etc. In addition, the amount of memory that will be required to store data to be downloaded can be provided by the central server which information may also be presented to the user whereby the user may elect to abort the downloading process if the diagnostic routine indicates that insufficient memory is available. Similarly, the amount of time that will be required to download data can be provided by the central server, given the network data transfer rate and the size of the down file, for presentation to the user whereby the user may again elect to abort the downloading process if the user feels the time is excessive. The system may also provide for the automatic termination of a download session in the case where the size of the data to be downloaded exceeds the amount of memory determined to be available.

As noted previously, the centralized device database server 300 may also use the device and/or function identity information to retrieve from the centralized device database graphical user interface elements, such as command key representations and layouts, that are appropriate for the identified device and/or function. The graphical user interface elements may then be downloaded as described above to the universal remote control 10 for use in providing a display by which the user can command the operation of the device. The graphical user interface elements can be embodied in an XHTML file or the like to be displayed using browser software resident on the universal remote control 10, as described in U.S. Application Ser. Nos. 60/264,767, 09/905,423, 09/905,432, and 09/905,396. Still further, the graphical user interface elements may be in a proprietary format compatible with specific remote control application software such as described in co-pending U.S. Patent Applications 60/344,020 and 60/334,774. Importantly, from an equipment manufacturer's point of view, offering downloadable graphical user interface elements in this manner allows the manufacturer to retain a degree of control over the "look and feel" of their device's remote control user interface, even when used with aftermarket LCD remote controls.

The centralized database server 300 may also be used to provide other information relevant to the operation of devices to the benefit of the consumer and/or device manufacturer. For example, device specific reference documentation such as user manuals, hook-up instructions, FAQs, and the like may be stored at the centralized database server and downloaded to the client device or universal remote control 10 according to the device identity information provided to the centralized database server 300. This additional information may be provided either as part of an initial setup procedure or at some later point by explicit user request. Alternatively, in cases where the remote control 10 is capable of wireless communication with the client device or directly to the server 300 (as shown, for example in FIGS. 15-20) reference information can be offered interactively using, for example, the techniques described in co-pending U.S. application Ser. No. 09/905,423.

Another application that may be supported by such a centralized server 300 is warranty registration. Since a remote control 10 can be expected to access the centralized database shortly after the consumer has purchased an appliance, warranty registration can be advantageously performed in conjunction with the database access made to setup the universal remote control 10 to communicate with/control the device. Depending upon the manufacturer, warranty registration may be partially or fully automated. For example, EPC data supplied to the universal remote control 10 by an appliance may uniquely identify an appliance via its serial number that, in turn, can be communicated to the centralized server 300. The user may then be requested to enter his personal information to complete the registration process. The user may also be identifiable by means of any stored RFID tag data that serves to identify an individual. Still further, in cases where the remote control function is implemented within a PDA device or access is made by means of a personal computer, either of which may already contain the user information, the retrieval of the personal information can also be made fully automatic using well known retrieval techniques.

In addition to warranty registrations, consumer demographic information may also be captured as part of the processes described herein. In this regard, the universal remote control 10 knows what other devices the consumer owns by virtue of the remote control 10 having been set up to control those devices. Accordingly, this information can be accumulated at the centralized server 300 for analysis. For example, answers to marketing research questions such as "How many purchasers of Sony DVD players also own a PVR?" and "What proportion of owned PVRs are Sony branded?" could be extracted from a such a data accumulation. Accumulated data for an individual may also be stored, as such information may be uploaded from the remote control, to allow for targeted marketing of services and/or appliances and appliance accessories.

Since the centralized device database inherently includes elements which infer the functionality of individual device brands and models (i.e., the remote control command set for each appliance operable by means of the remote control 10) another service that could be offered to the consumer through the server may be the ability to research feature sets of devices of different manufacturers prior to purchasing an appliance. For example, a consumer may access the centralized database and inquire "Which PVR models have dual tuners?" or "Which Panasonic TVs support picture-in-picture."

Another feature that a manufacturer may wish to offer through the centralized server 300 is providing customers with information regarding the availability of accessories, supplies, and add-on equipment. Advantageously, the centralized server 300 can be used to prepare sales catalog listings that could be tailored to a particular device type and model using the device identity and/or serial number information received from the remote control 10. Targeted marketing may also be derived from user profiles, using personal information of registrants, in manners that are well known in the art. Tailored catalog and purchasing information can be downloaded to the client device 302 or the universal remote control 10 itself for display to and perusal by the consumer. Once this information is presented to a user, either on the display of the universal remote control 10 or a display associated with a client device, orders can be placed interactively through the centralized server 300 using well known e-commerce principals.

Still further, since consumer electronic devices are designed to allow for upgrade of their internal firmware programming to add future capabilities, updated remote control command code libraries and/or GUI layouts may be provided to the universal remote control 10 via the centralized device database server to match any upgrades. By way of example, digital cable or satellite set-top boxes, PVRs, and the like, as illustrated in FIG. 20, can have their capabilities updated from a remote location without any significant involvement by the user. In cases where an update to the device functionality is received, the consumer may be prompted to manually initiate a further remote control setup in order to acquire a corresponding command code/GUI update from the centralized device database. Alternatively, the newly-loaded device firmware update could automatically initiate a DAS/FCD sequence to, in turn, initiate the setting up of the universal remote control 10 using one or more of the procedures described herein.

In the case where the universal remote control 10 uses an LCD or other display and/or a touch screen to implement the user interface, the information downloaded from the centralized database server 300 would result in a user interface appropriate for the device and the new device functionality with no further action on the user's part. In the case of a universal remote control 10 with hard keys only, the centralized database server 300 may be used to provide new labeling for the remote control 10. For example, in some embodiments it is contemplated that the manufacturer will build a base, universal remote control 10 having a set of blank, configurable keys and, possibly, basic functions expected to be required by everyone (e.g., volume control keys, digit keys, channel control keys, power). Provision may then be made at the centralized database server 300 to create custom labels for the blank keys in connection with the setup process which can be downloaded and printed on an overlay for use in connection with the universal remote control 10 to identify to the user the functions to be controlled upon activation of a remote control key.

Still further, once a device is identified, the customer can be allowed to customize the key configuration and/or graphical user interface of the universal remote control 10. To this end, the consumer may be presented with one or more screens, showing a virtual representation of the remote control 10 together with a table of all functions available for the device. Using a "drag and drop" interface, for example, the consumer may assign functions to blank keys/iconic locations on the universal remote control 10. In some cases, users may be presented with iconic layouts for LCD displays that, while user alterable, are preformatted, based on the device ID, so as to have a key layout appearance similar to the original remote control provided by the manufacturer of a device. When the key layout configuration process is completed by a user, the centralized device database server 300 downloads the configuration into the remote control 10 as described above. This process may be performed using GUI tools located on an intermediate gateway and/or on the universal remote control 10 itself.

In the case where blank hard keys are utilized, the consumer may print a label further provided by the central server 300 to be installed on the universal remote control 10. In an alternative labeling approach, the central server 300 could transmit the label data to a center where a more durable label, e.g., a mylar overlay, would be pad printed and mailed to the user. Various means for providing labels to the remote control 10 are illustrated in U.S. application Ser. No. 09/615,473.

In yet another case, the user may access the centralized device database to download to the universal remote control 10 one or more sequences of instructions to perform various operations, otherwise known as macros. For example, a user who has just purchased a new VCR may be able to download preprogrammed macros which facilitate setup and adjustment of a home theater system in which the VCR is inferred to be a part of. In this case, the devices in the home theater system can be inferred from prior device setups performed using the centralized device database. As additional appliances are added to the universal remote control 10, the centralized server can use the appliance information to make informed decisions regarding the instructions to include in a macro given the appliances owned by a user. Alternatively, the user can be presented with one or more screens by which the user can create a custom sequence of macro instructions.

As described above, to, in part, avoid overloading memory in the remote control 10, the user can be provided with a memory indicator indicating, preferably on a percent basis, how much memory is available in the remote control 10 for downloading further data. Memory usage may be maintained locally or remotely, e.g., at the centralized database server. In another embodiment, the indicator represents the amount of memory the download will use without regard to the amount of data already stored in memory.

While specific embodiments of the present invention have been described in detail, it will be appreciated by those skilled in the art that various modifications and alternatives to those details could be developed in light of the overall teachings of the disclosure. For example, it should be appreciated that any of the above described methods can be used alone or in combination to setup the remote control 10. Additionally, as noted, the functionality of the universal remote control 10 can be included in other devices such as PDAs, personal computers, home devices, or the like. Accordingly, it will be understood that the particular arrangements and procedures disclosed are meant to be illustrative only and not limiting as to the scope of the invention which is to be given the full breadth of the appended claims and any equivalents thereof.

All of the cited patents and patent applications are hereby incorporated by reference in their entirety.

What is claimed is:

1. A system, comprising:
    packaging for an appliance, the packaging having a machine readable tag storing standardized information that functions to identify at least the appliance and manufacturer of the appliance; and
    a universal remote control having a transmission circuit for communicating commands to the appliance, a device dedicated to obtaining data from the machine readable tag of the packaging, and a setup program that uses data obtained from the machine readable tag of the packaging via the device dedicated to obtaining data from the machine readable tag to cause select commands to be mapped to select command keys of the universal remote control whereby the universal remote control is set up such that subsequent activation of one or more of the select command keys of the universal remote control causes the universal remote control to issue via the transmission circuit one or more of the select commands to thereby command operation of the appliance.

2. The system as recited in claim 1, wherein the machine readable tag comprises an RFID label and the device of the universal remote control dedicated to obtaining data from a machine readable tag comprises a device dedicated to the purpose of obtaining data from the RFID label.

3. The system as recited in claim 1, wherein the setup program functions to select the select commands from a library of commands locally stored on the universal remote control.

4. The system as recited in claim 1, comprising a server device in communication with the universal remote control, the server device being used to access a library of commands stored remotely from the universal remote control and to download the select commands to the universal remote control.

5. The system as recited in claim 4, comprising an intermediate device by which the server device is placed into communication with the universal remote control.

6. The system as recited in claim 5, wherein the intermediate device comprises a cable set top box.

7. The system as recited in claim 5, wherein the intermediate device comprises a personal computer.

8. The system as recited in claim 1, wherein the setup procedure further uses data obtained from the machine readable tag of the packaging to automatically assign the appliance to a select operational mode of the universal remote control whereupon, in response to the universal remote control being placed into the select operational mode, the universal remote control is set up such that subsequent activation of one or more of the select command keys of the universal remote control causes the universal remote control to issue via the transmission circuit one or more of the select commands to thereby command operation of the appliance.

9. The system as recited in claim 1, comprising a server device in communication with the universal remote control, the server device receiving from the universal remote control at least a portion of data obtained from the machine readable tag of the packaging via the device dedicated to obtaining data from the machine readable tag and using such data to automatically register the appliance within a warranty registration database.

10. The system as recited in claim 9, comprising an intermediate device by which the server device is placed into communication with the universal remote control.

11. The system as recited in claim 10, wherein the intermediate device comprises a cable set top box.

12. The system as recited in claim 10, wherein the intermediate device comprises a personal computer.

13. A method for configuring a universal remote control to communicate commands to an appliance, comprising:
    causing a device of the universal remote control dedicated to obtaining data from a machine readable tag to obtain data from a machine readable tag placed upon packaging for the appliance wherein the machine readable tag placed upon packaging for the appliance has stored standardized information that functions to identify at least the appliance and manufacturer of the appliance; and
    using data obtained from the machine readable tag of the packaging via the device dedicated to obtaining data from the machine readable tag to cause select commands to be mapped to select command keys of the universal remote control whereby the universal remote control is set up such that subsequent activation of one or more of the select command keys of the universal remote control causes the universal remote control to issue via a transmission circuit of the universal remote control one or more of the select commands to thereby command operation of the appliance.

14. The method as recited in claim 13, wherein the machine readable tag comprises an RFID label and the device of the universal remote control dedicated to obtaining data from a machine readable tag comprises a device dedicated to the purpose of obtaining data from the RFID label.

15. The method as recited in claim 13, wherein data obtained from the machine readable tag of the packaging via the device dedicated to obtaining data from the machine readable tag is used to select commands from a library of commands locally stored on the universal remote control.

16. The method as recited in claim 13, wherein data obtained from the machine readable tag of the packaging via the device dedicated to obtaining data from the machine readable tag is used to select commands from a library of commands stored remotely from the universal remote control which are then downloaded into the universal remote control.

17. The method as recited in claim 16, comprising accessing the library of commands and downloading the select commands to the universal remote control via a server device in communication with the universal remote control.

18. The method as recited in claim 17, comprising using an intermediate device to place the universal remote control into communication with the server device.

19. The method as recited in claim 18, wherein the intermediate device comprises a cable set top box.

20. The method as recited in claim 18, wherein the intermediate device comprises a personal computer.

21. The method as recited in claim 13, comprising using data obtained from the machine readable tag of the packaging to automatically assign the appliance to a select operational mode of the universal remote control whereupon, in response to the universal remote control being placed into the select operational mode, the universal remote control is set up such that subsequent activation of one or more of the select command keys of the universal remote control causes the universal remote control to issue via the transmission circuit one or more of the select commands to thereby command operation of the appliance.

22. The method as recited in claim 13, comprising providing at least a portion of data obtained from the machine readable tag of the packaging via the device dedicated to obtaining data from the machine readable tag to a server device in communication with the universal remote control whereupon the server device uses received data to automatically register the appliance within a warranty registration database.

23. The method as recited in claim 22, comprising using an intermediate device to place the universal remote control into communication with the server device.

24. The method as recited in claim 23, wherein the intermediate device comprises a cable set top box.

25. The method as recited in claim 23, wherein the intermediate device comprises a personal computer.

26. A method for setting up a universal remote control having a device dedicated to obtaining data from a machine readable tag and a separate transmission circuit for communicating commands to an appliance, the method comprising:
receiving into the universal remote control via the device of the universal remote control dedicated to obtaining data from a machine readable tag data obtained from a machine readable tag associated with an appliance, the machine readable tag storing standardized information that functions to identify at least the appliance and manufacturer of the appliance;
using the data received into the universal remote control to access information to be used to configure the universal remote control; and
using in a setup procedure of the universal remote control the information accessed as a result of receiving the data to cause select commands to be mapped to select command keys of the universal remote control whereby the universal remote control is set up such that subsequent activation of one or more of the select command keys of the universal remote control causes the universal remote control to issue via the transmission circuit of the universal remote control one or more of the select commands to thereby command operation of the appliance associated with the machine readable tag from which the data was obtained via the device of the universal remote control dedicated to obtaining data from a machine readable tag.

27. The method as recited in claim 26, wherein the machine readable tag comprises a UPC label and the device of the universal remote control dedicated to obtaining data from a machine readable tag comprises a device dedicated to the purpose of obtaining data from the UPC label.

28. The method as recited in claim 26, wherein the machine readable tag comprises an RFID label and the device of the universal remote control dedicated to obtaining data from a machine readable tag comprises a device dedicated to the purpose of obtaining data from the RFID label.

29. The method as recited in claim 28, comprising using the information accessed as a result of receiving the data to select the select commands from a library of commands locally stored on the universal remote control.

30. The method as recited in claim 28, wherein the information accessed as a result of receiving the data comprises commands selected from a library of commands stored remotely from the universal remote control.

31. The method as recited in claim 30, comprising causing the universal remote control to directly communicate with a server device associated with the library of commands.

32. The method as recited in claim 30, comprising causing the universal remote control to communicate via an intermediate device with a server device associated with the library of commands.

33. The method as recited in claim 32, wherein the intermediate device comprises a cable set top box.

34. The method as recited in claim 32, wherein the intermediate device comprises a personal computer.

35. The method as recited in claim 28, wherein the setup procedure of the universal remote control further uses the data received into the universal remote control to automatically assign the appliance associated with the machine readable tag to a select operational mode of the universal remote control whereupon, in response to the universal remote control being placed into the select operational mode, the universal remote control is set up such that subsequent activation of one or more of the select command keys of the universal remote control causes the universal remote control to issue via a transmission circuit of the universal remote control one or more of the select commands to thereby command operation of the appliance associated with the machine readable tag without again requiring use of the device of the universal remote control dedicated to obtaining data from a machine readable tag.

36. The method as recited in claim 28, comprising receiving user input into the universal remote control that specifies a select operational mode of the universal remote control to which the appliance associated with the machine readable tag is to be assigned whereupon, in response to the universal remote control being placed into the select operational mode, the universal remote control is set up such that subsequent activation of one or more of the select command keys of the universal remote control causes the universal remote control to issue via the transmission circuit of the universal remote control one or more of the select commands to thereby command operation of the appliance associated with the machine readable tag without again requiring use of the device of the universal remote control dedicated to obtaining data from a machine readable tag.

37. A method for setting up a universal remote control having a device dedicated to obtaining data from a machine readable tag and a separate transmission circuit for communicating commands to an appliance, the method comprising:
receiving into the universal remote control via the device of the universal remote control dedicated to obtaining data from a machine readable tag data obtained from a plurality of machine readable tags each associated with an appliance, each of the plurality of machine readable tags storing standardized information that functions to identify at least its respectively associated appliance and manufacturer of its respectively associated appliance;

using the data received into the universal remote control to access information to be used to configure the universal remote control; and using in a setup procedure of the universal remote control the information accessed as a result of receiving the data to cause select commands to be mapped to select command keys of the universal remote control whereby the universal remote control is set up such that subsequent activation of one or more of the select command keys of the universal remote control causes the universal remote control to issue via the transmission circuit of the universal remote control one or more of the select commands to command operation of one or more appliance associated with the plurality of machine readable tags from which data was obtained via the device of the universal remote control dedicated to obtaining data from a machine readable tag.

38. The method as recited in claim 37, wherein each of the plurality of machine readable tags comprises a UPC label and the device of the universal remote control dedicated to obtaining data from a machine readable tag comprises a device dedicated to the purpose of obtaining data from the UPC label.

39. The method as recited in claim 37, wherein each of the plurality of machine readable tags comprises an RFID label and the device of the universal remote control dedicated to obtaining data from a machine readable tag comprises a device dedicated to the purpose of obtaining data from the RFID label.

40. The method as recited in claim 39, comprising using the information accessed as a result of receiving the data to select the select commands from a library of commands locally stored on the universal remote control.

41. The method as recited in claim 39, wherein the information accessed as a result of receiving the data comprises commands selected from a library of commands remotely stored from the universal remote control.

42. The method as recited in claim 41, comprising causing the universal remote control to directly communicate with a server device associated with the library of commands.

43. The method as recited in claim 41, comprising causing the universal remote control to communicate via an intermediate device with a server device associated with the library of commands.

44. The method as recited in claim 43, wherein the intermediate device comprises a cable set top box.

45. The method as recited in claim 43, wherein the intermediate device comprises a personal computer.

46. The method as recited in claim 39, wherein the setup procedure of the universal remote control further uses the data received into the universal remote control to automatically assign the appliance associated with at least one of the plurality of machine readable tags to a select operational mode of the universal remote control whereupon, in response to the universal remote control being placed into the select operational mode, the universal remote control is set up such that subsequent activation of one or more of the select command keys of the universal remote control causes the universal remote control to issue via the transmission circuit of the universal remote control one or more of the select commands to thereby command operation of the appliance associated with the one or more of the plurality of machine readable tags without again requiring use of the device of the universal remote control dedicated to obtaining data from a machine readable tag.

47. The method as recited in claim 46, wherein the select operational mode of the universal remote control comprises a home theater mode.

48. The method as recited in claim 46, wherein the select operational mode of the universal remote control comprises a room mode.

49. The method as recited in claim 39, comprising receiving user input into the universal remote control that specifies at least one select operational mode of the universal remote control to which the appliance associated with one or more of the plurality of machine readable tags is to be assigned whereupon, in response to the universal remote control being placed into the select operational mode, the universal remote control is set up such that subsequent activation of one or more of the select command keys of the universal remote control causes the universal remote control to issue via the transmission circuit of the universal remote control one or more of the select commands to thereby command operation of the appliance associated with the one or more of the plurality of machine readable tags without again requiring use of the device of the universal remote control dedicated to obtaining data from a machine readable tag.

50. The method as recited in claim 49, wherein the select operational mode of the universal remote control comprises a home theater mode.

51. The method as recited in claim 49, wherein the select operational mode of the universal remote control comprises a room mode.

52. The method as recited in claim 28, further comprising transmitting from the universal remote control by the device of the universal remote control dedicated to obtaining data from a machine readable tag an RF signal to initiate obtaining of the data from the RFID tags.

53. The method as recited in claim 28, wherein the device of the universal remote control dedicated to obtaining data from a machine readable tag obtains data from each of the plurality of machine readable tags within an area of radio communication with the universal remote control.

54. An apparatus, comprising:
a remote control, the remote control having a first transmitter, a first receiver, and a setup procedure, the first transmitter to transmit an interrogation signal to a device, the first receiver to receive a device identifier for the device, and the setup procedure using information corresponding to the device identifier to configure the remote control to send control information to the device;
wherein the remote control further comprises a second transmitter and a second receiver, the second transmitter to transmit a request for the information to a first node, the request including the device identifier, and the second receiver to receive the information from the first node.

55. The apparatus as recited in claim 54, wherein the device identifier comprises an electronic product code.

56. The apparatus as recited in claim 54, wherein the information comprises capability and configuration information necessary to configure the remote control to control the device.

57. The apparatus as recited in claim 54, wherein the device identifier comprises a device activated setup (DAS) transmission.

58. The apparatus as recited in claim 54, wherein the device identifier comprises a functional capability definition (FCD) transmission.

59. A system, comprising:
  a device having a radio-frequency identification tag, the radio-frequency identification tag to communicate a device identifier in response to an interrogation signal; and
  a remote control to remotely control the device, the remote control having a first antenna, a first transmitter, a first receiver, and a setup procedure, the first transmitter to transmit an interrogation signal to the device using the first antenna, the first receiver to receive the device identifier for the device using the first antenna, and the setup procedure to configure the remote control using information corresponding to the device identifier;
  wherein the remote control further comprises a second transmitter and a second receiver, the second transmitter to transmit a request for the information to a first node, the request including the device identifier, and the second receiver to receive the information from the first node, the information to configure the remote control to send control information to the device.

60. The system as recited in claim 59, wherein the device identifier comprises an electronic product code.

61. The system as recited in claim 59, wherein the information comprises capability and configuration information necessary to configure the remote control to control the device.

62. The system as recited in claim 59, wherein the device identifier comprises a device activated setup (DAS) transmission.

63. The system as recited in claim 59, wherein the device identifier comprises a functional capability definition (FCD) transmission.

64. A method, comprising:
  transmitting from a remote control an interrogation signal to a device capable of being controlled remotely;
  receiving at the remote control a device identifier for the device;
  sending from the remote control a request for information to a first node, the request including the device identifier;
  receiving at the remote control the information from the first node; and
  configuring the remote control using the information.

65. The method as recited in claim 64, wherein the device identifier comprises an electronic product code.

66. The method as recited in claim 64, wherein the information comprises capability and configuration information necessary to configure the remote control to control the device.

67. The method as recited in claim 64, wherein the device identifier comprises a device activated setup (DAS) transmission.

68. The method as recited in claim 64, wherein the device identifier comprises a functional capability definition (FCD) transmission.

69. An article comprising a medium storing instructions that when executed by a processor are operable to transmit an interrogation signal from a remote control to a device capable of being controlled remotely, receive at the remote control a device identifier for the device, send from the remote control a request for information to a first node, receive at the remote control the information from the first node, and configure the remote control using the information, wherein the request includes the device identifier.

70. The article as recited in claim 69, wherein the device identifier comprises an electronic product code.

71. The article as recited in claim 69, wherein the information comprises capability and configuration information necessary to configure the remote control to control the device.

72. The article as recited in claim 69, wherein the device identifier comprises a device activated setup (DAS) transmission.

73. The article as recited in claim 69, wherein the device identifier comprises a functional capability definition (FCD) transmission.

* * * * *